US008818831B2

(12) United States Patent
Yagi

(10) Patent No.: US 8,818,831 B2
(45) Date of Patent: Aug. 26, 2014

(54) SERVICE LEVEL OBJECTIVE MANAGEMENT SYSTEM, SERVICE LEVEL OBJECTIVE MANAGEMENT METHOD AND PROGRAM

(75) Inventor: Shinjiro Yagi, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/977,760

(22) PCT Filed: Apr. 18, 2012

(86) PCT No.: PCT/JP2012/002679
§ 371 (c)(1),
(2), (4) Date: Jul. 1, 2013

(87) PCT Pub. No.: WO2012/144204
PCT Pub. Date: Oct. 26, 2012

(65) Prior Publication Data
US 2013/0297362 A1 Nov. 7, 2013

(30) Foreign Application Priority Data
Apr. 22, 2011 (JP) ................................. 2011-096395

(51) Int. Cl.
*G06Q 10/00* (2012.01)

(52) U.S. Cl.
USPC ........................................................ 705/7.11

(58) Field of Classification Search
USPC ........................................................ 705/7.12
See application file for complete search history.

(56) References Cited

U.S. PATENT DOCUMENTS

| 5,865,192 | A | | 2/1999 | Sealy | |
|---|---|---|---|---|---|
| 6,115,690 | A | * | 9/2000 | Wong | 705/7.27 |
| 6,157,915 | A | * | 12/2000 | Bhaskaran et al. | 705/7.11 |
| 6,655,389 | B2 | | 12/2003 | Bertucci | |
| 7,313,533 | B2 | * | 12/2007 | Chang et al. | 705/7.38 |
| 7,412,403 | B2 | * | 8/2008 | Subbloie et al. | 705/7.35 |
| 7,739,136 | B2 | * | 6/2010 | Chang et al. | 705/7.39 |
| 8,028,066 | B2 | * | 9/2011 | Lewis | 709/224 |
| 8,073,721 | B1 | * | 12/2011 | Lewis | 705/7.12 |
| 8,082,927 | B2 | | 12/2011 | Bonge | |
| 8,380,557 | B2 | * | 2/2013 | Moon et al. | 705/7.28 |
| 2004/0074511 | A1 | | 4/2004 | Sussan | |
| 2008/0301255 | A1 | | 12/2008 | He et al. | |
| 2009/0223530 | A1 | | 9/2009 | Chapman | |
| 2009/0307335 | A1 | * | 12/2009 | Bantz et al. | 709/219 |

FOREIGN PATENT DOCUMENTS

| JP | 2005-301845 A | | 10/2005 |
|---|---|---|---|
| JP | 2011-018167 A | | 1/2011 |
| WO | WO 03084133 A1 | * | 10/2003 |

* cited by examiner

*Primary Examiner* — Romain Jeanty
(74) *Attorney, Agent, or Firm* — Sughrue Mion, PLLC

(57) ABSTRACT

The present invention enables SLOs and their values to be determined in a system established for the purpose of providing services to users by accepting requirement values from a user with respect to desired SLOs, and presenting, as candidates which can be selected by a user, SLO groups satisfying those requirement values and SLO groups satisfying those requirement values as nearly as possible, and prompting the user to select a candidate. With this service level objective management system, an administrator inputs SLO names, SLO group names, the SLO names and target values for SLOs belonging to the SLO groups, a hierarchical relationships of the SLO groups, and the like. In addition, user-specified SLO names and requirement values with respect to those SLOs are received from user terminals. A combination specification means 94 calculates the degree to which the target values satisfy the requirement values for each combination of SLO groups, from the highest-ranked SLO group to the lowest-ranked SLO group.

11 Claims, 11 Drawing Sheets

PLANNED DOWNTIME  EVERY SATURDAY 5:00 TO SUNDAY 23:00
RECOVERY LEVEL OBJECTIVE  48 HRS.
SERVICE SWITCHOVER TIME  15 MIN.
AVAILABILITY RATIO  95%
NOTIFICATION TIME  1 HR.

| COMBINATION | ACHIEVEMENT RATE | PRICE |
|---|---|---|
| SLOG1 – SLOG3 – SLOG5 | 100% | 70000 |
| SLOG1 – SLOG3 – SLOG4 | 100% | 80000 |
| SLOG1 – SLOG2 – SLOG5 | 80% | 50000 |
| SLOG1 – SLOG2 – SLOG4 | 80% | 60000 |

| DEFINED NAME | OBJECT PLATFORM | MEASUREMENT POINT |
|---|---|---|
| CPU | Windows | % Processor Time |
| CPU | Linux | %system + %user |

SERVICE LEVEL OBJECTIVE MANAGEMENT SYSTEM, SERVICE LEVEL OBJECTIVE MANAGEMENT METHOD AND PROGRAM

CROSS REFERENCE TO RELATED APPLICATIONS

This application is a National Stage of International Application No. PCT/JP2012/002679 filed Apr. 18, 2012, claiming priority based on Japanese Patent Application No. 2011-096395, filed Apr. 22, 2011, the contents of all of which are incorporated herein by reference in their entirety.

TECHNICAL FIELD

The present invention relates to a service level objective management system, a service level objective management method and a service level objective management program for managing service level objectives (SLO) used in the configuration of a user-service provisioning environment in a data center.

BACKGROUND ART

A case where a data center provides a service such as IaaS (Infrastructure as a Service) or PaaS (Platform as a Service) is disclosed in PLT1.

If a data center provides a user with a service, a service level agreement (SLA) is concluded between an administrator of the data center and the user. An SLA is an agreement on the quality and content of service provided by a computer system. A service level objective (SLO) is an objective to which a target value is defined to achieve the SLA. Hereinafter, a service level objective may be referred to as an SLO.

In general, in the case of configuring a system by which a data center provides a user with a service, whether or not an SLA can be complied with by the system is checked by hand or by using a support system, etc.

CITATION LIST

Patent Literature

PLT1: JP 2011-18167 A (paragraph 0084)

SUMMARY OF INVENTION

Technical Problem

When a user receives a provision of service, it is desirable that the user specifies requirement values for various SLOs and a data center is able to present the user a group of SLOs that satisfy the requirement values or SLOs that satisfy the requirement values as nearly as possible as candidates which can be selected by the user.

The object of the present invention is to provide a service level objective management system, a service level objective management method, and a service level objective management program that enables SLOs and their values to be determined in a system established for the purpose of providing services to users by accepting requirement values from a user with respect to desired SLOs, and presenting, as candidates which can be selected by a user, SLO groups satisfying those requirement values and SLO groups satisfying those requirement values as nearly as possible, and prompting the user to select a candidate.

Solution to Problem

A service level objective management system according to the present invention includes: a service level objective information input means that inputs, from an administrator of a data center, a service level objective name which is the name of a service level objective defined by the administrator and a condition on which a value defined by the administrator for the service level objective satisfies a requirement value for the service level objective required by a user whom a service is provided from the data center; a group information input means that inputs a group name which is the name of a service level objective group including at least one service level objective out of service level objectives whose service level objective names are input to the service level objective information input means by the administrator, a service level objective name of each service level objective included in the service level objective group, a target value defined by the administrator for each of the service level objectives, and a group name of another service level objective group to which the administrator defines a hierarchical relationship with the service level objective group; a user requirement reception means that receives, from a user terminal of a user who is provided a service from the data center, a service level objective name of a service level objective specified by the user out of service level objectives whose service level objective names are input to the service level objective information input means and a requirement value required by the user for the service level objective; a combination specification means that computes, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifies a plurality of combinations having high degrees by a predetermined criterion; and a combination presentation means that transmits display contents of a screen displaying the individual combination of service level objective groups specified by the combination specification means to the user terminal and receives information on the combination of service level objective groups selected by the user from the user terminal.

A service level objective management method according to the present invention includes: receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center; receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group; receiving, from a user terminal of a user who is provided a service from the data center, a service level objective name of a service level objective specified by the user out of service level objectives whose service level objective names are input and a requirement value required by the user for the service level objective;

computing, for every combination of service level objective groups from a highest-ranked service level objective group to a lowest-ranked service level objective group among hierarchized service level objective groups, a degree at which the target value of each service level objective in the service level objective group belonging to the combination satisfies the requirement value received from the user terminal with the service level objective name; specifying a plurality of combinations having the high degrees by a predetermined criterion; transmitting display contents of a screen displaying the specified combination of service level objective groups individually to the user terminal; and receiving information of the combination of service level objective groups selected by the user from the user terminal.

A service level objective management program according to the present invention makes a computer execute: service level objective information input processing for receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center; group information input processing for receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group; user requirement reception processing for receiving, from a user terminal of a user who is provided a service from the data center, a service level objective name of a service level objective specified by the user out of service level objectives whose service level objective names are input and a requirement value required by the user for the service level objective; combination specification processing for computing, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifying a plurality of combinations having the high degrees by a predetermined criterion; and combination presentation processing for transmitting display contents of a screen displaying the individual combination of service level objective groups specified by the combination specification processing to the user terminal and receiving information of the combination of service level objective groups selected by the user from the user terminal.

Advantageous Effects of Invention

According to the present invention, SLOs and their values can be determined in a system established for the purpose of providing services to users by accepting requirement values from a user with respect to desired SLOs, and presenting, as candidates which can be selected by a user, SLO groups satisfying those requirement values and SLO groups satisfying those requirement values as nearly as possible, and prompting the user to select a candidate.

DESCRIPTION OF EMBODIMENTS

Hereinafter, an exemplary embodiment of the invention will be described with reference to the drawings.

First, the outline of the present invention will be described. In a data center to which the present invention is applied, servers necessary for providing a service to users are grouped and placed in each partition. A VM (Virtual Machine) is configured on the servers and the VM provides users with the service. Each server is categorized and allocated to a partition according to its performance. For example, a group of high performance servers (that is a group of servers capable of providing a high-quality service) is allocated to a first partition. A group of servers with lower performance than the servers in the first partition is allocated to a second partition, and a group of servers with lower performance than the servers in the second partition is allocated to a third partition. There is no particular upper limit to the number of partitions in the allocation.

The VM configured in a partition in the data center provides a user with a service such as IaaS or PaaS.

In the SLO management system of the present invention, an administrator of a data center (hereinafter, "administrator") defines SLOs, from which a user can select suitable SLOs, and their values (target values). The user-selectable SLO defined by the administrator is referred to as a "deliverable SLO" in the following description.

The administrator defines deliverable SLOs and their values for each partition in the data center. In this definition, the administrator may define the same deliverable SLOs for all partitions or define specific deliverable SLOs for each partition individually.

The administrator also creates groups of deliverable SLOs with defined target values for each partition. A group of deliverable SLOs with defined target values is referred to as an "SLO group" in the following description. If a partition is focused on, there may be defined more than one SLO group for the partition. When the administrator defines a plurality of SLO groups for a partition, the administrator also defines a rank for each of the SLO groups. In other words, the administrator defines hierarchical relationships, i.e. higher-rank and lower-rank relationships, among the SLO groups. In the hierarchical relationship definition, the administrator needs to keep the relationships compatible in such a way that the satisfaction of the target values of a lower-ranked SLO group causes the satisfaction of the target values of a SLO group ranked higher than the lower-ranked SLO group as well. An SLO group can be ranked higher than a plurality of SLO groups. An SLO group can also be ranked lower than a plurality of SLO groups.

Figure 1:
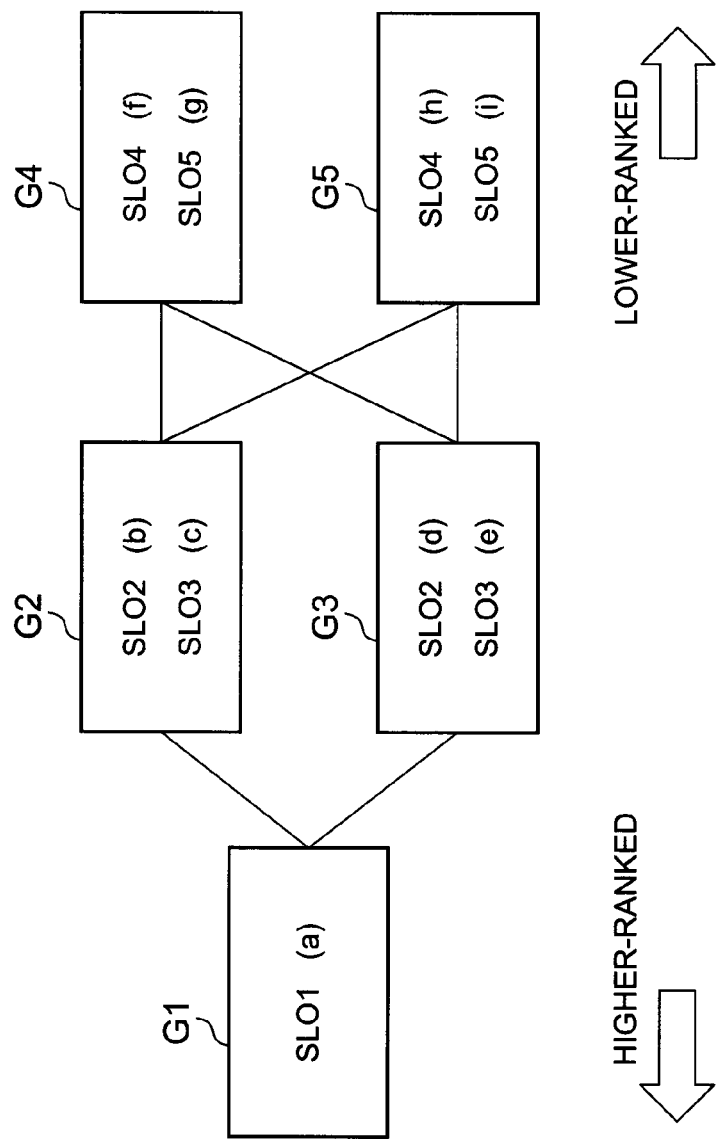
[FIG. 1] It depicts an exemplary diagram illustrating an example of hierarchical relationships among SLO groups.

FIG. 1 is an exemplary diagram illustrating an example of hierarchical relationships among SLO groups. Five SLO groups G1 to G5 are exemplified in FIG. 1. In FIG. 1, SLO1 to SLO5 shown in the SLO groups indicate deliverable SLOs and symbols shown inside pairs of parentheses in the SLO groups indicate target values defined by the administrator for the respective deliverable SLOs. In the example shown in FIG. 1, the higher an SLO group is ranked, the more left position a box indicating the SLO group are arranged, and vice versa. That is, the SLO group G1 is the highest-ranked group and both the SLO groups G2 and G3 have the SLO group G1 ranked higher than them. In the same way, the SLO groups G4 and G5 both have the SLO groups G2 and G3 ranked higher than them.

A deliverable SLO that is allocated to a plurality of SLO groups may have a different value as its target value for each of the plurality of SLO groups. For example, in the example shown in FIG. 1, the deliverable SLOs SLO2 and SLO3 are both included in the SLO groups G2 and G3 but have different values as their target values for the SLO groups G2 and G3 respectively. The SLO groups G2 and G3 can be defined in this manner.

A service level objective management system of the present invention (hereinafter, "SLO management system") supports the administrator to define deliverable SLOs, values of the deliverable SLOs, SLO groups, and a hierarchical structure of the SLO groups.

When the administrator defines the hierarchical structure of the SLO groups, a combination of SLO groups from the highest-ranked SLO group to the lowest-ranked SLO group is also defined. For example, in the hierarchical structure illustrated in FIG. 1, a combination including G1, G2, and G4 and a combination including G1, G3, and G4 can be defined as combinations of SLO groups from the highest-ranked SLO group G1 to the lowest-ranked SLO group G4. In the same way, a combination including G1, G2, and G5 and a combination including G1, G3, and G5 can be defined as combinations of SLO groups from the highest-ranked SLO group G1 to the lowest-ranked SLO group G5.

In the example case shown in FIG. 1, however, the SLO groups G2 and G3 cannot belong to the same combination because there is no hierarchical relation between the SLO groups G2 and G3. Similarly, the SLO groups G4 and G5 cannot belong to the same combination because there is no hierarchical relation between the SLO groups G4 and G5.

In the SLO management system of the present invention, a user provided with a service specifies requirement values for the deliverable SLOs defined by the administrator. The requirement value specified by the user for a deliverable SLO may differ from the value defined by the administrator for the deliverable SLO. The user may specify requirement values for at least a part of the deliverable SLOs defined by the administrator.

The SLO management system of the present invention identifies a plurality of combinations of SLO groups that satisfy to a high degree the requirement values specified by the user for the deliverable SLOs within all combinations of SLO groups from the highest-ranked SLO group to the lowest-ranked SLO group to which the administrator defines hierarchical relationships, and presents the plurality of combinations to the user. The SLO management system of the present invention then makes the user select an SLO group combination from the plurality of combinations of SLO groups. The SLO management system of the present invention configures a VM, which is able to achieve the values (the target values specified by the administrator) of the deliverable SLOs defined in the combination of SLO groups selected by the user, on servers in the partition to which the SLO groups are allocated.

The SLO management system of the present invention may, after a VM has started providing a service to the user, compute and present to the user the values of deliverable SLOs based on the performance of the VM. For this exemplary embodiment, a case where the SLO management system not only constructs a VM but also computes and presents to a user the performance values of deliverable SLOs during VM operation will be described.

In other words, the processes executed by an SLO management system of the exemplary embodiment are composed of mainly two parts, processes to configure a VM on servers in a data center and processes to compute and present to a user the values of deliverable SLOs based on performance status during VM operation.

Figure 2:
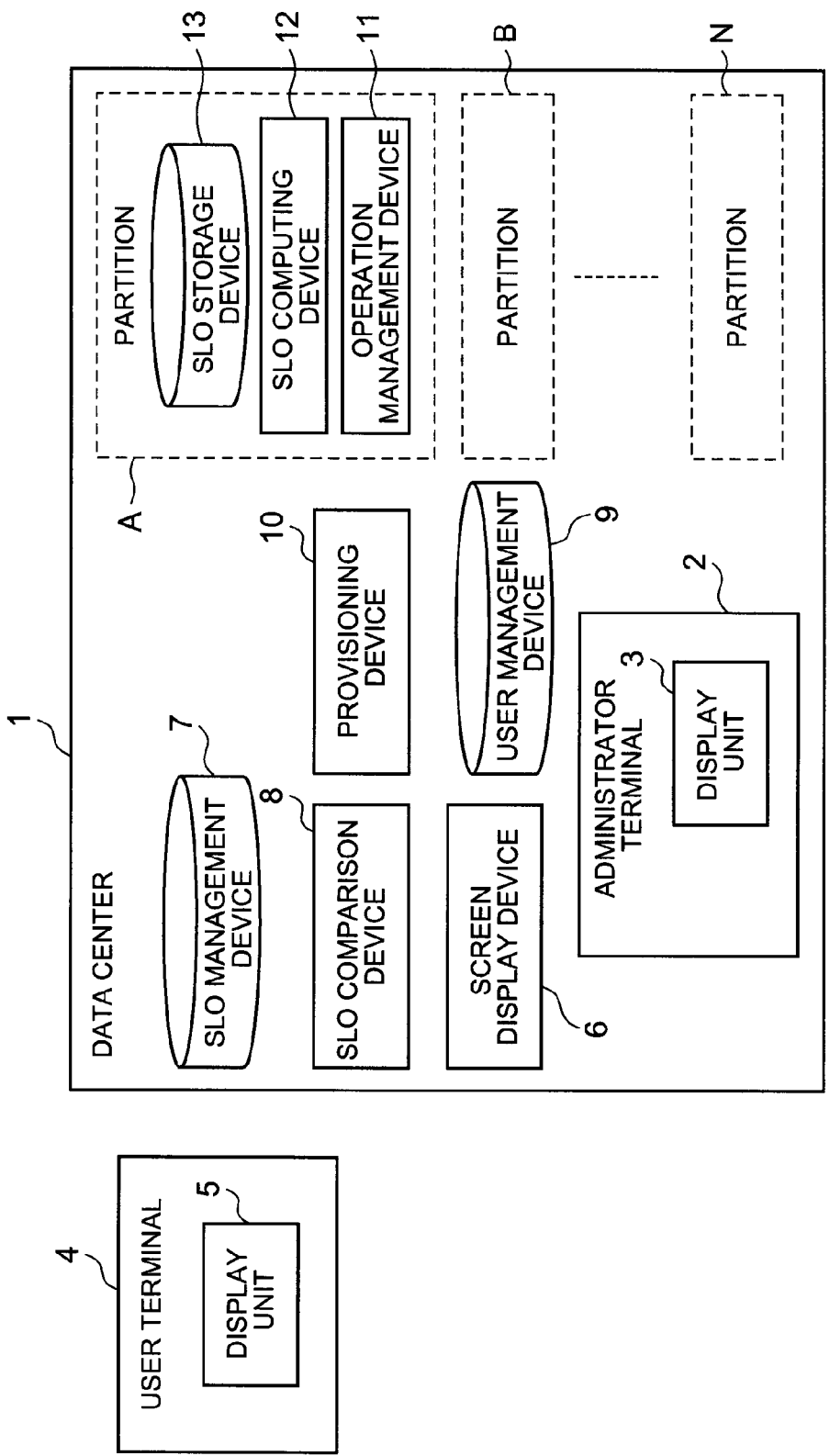
[FIG. 2] It depicts an explanatory diagram illustrating a configuration of an SLO management system of the present invention.

An example of a configuration of an SLO management system according to the present invention will be described below. FIG. 2 is an explanatory diagram illustrating a configuration of the SLO management system of the present invention. An arrangement of elements of the SLO management system in a data center 1 is exemplified in FIG. 2.

The SLO management system according to the present invention has an administrator terminal 2, a screen display device 6, an SLO management device 7, an SLO comparison device 8, a user management device 9, and a provisioning device 10.

The SLO management system according to the present invention also has an operation management device 11, an SLO computing device 12, and an SLO storage device 13 in each partition in the data center 1. Though only an operation management device 11, an SLO computing device 12, and an SLO storage device 13 allocated to a partition A are shown in FIG. 2, an operation management device 11, an SLO computing device 12, and an SLO storage device 13 are also allocated to each of partitions B to N. Moreover, although only the partitions A to N are shown in FIG. 2, there is no upper limit to the number of partitions.

A server cluster on which a VM is configured is allocated in every partition. However, the servers in each partition are not shown in FIG. 2.

The administrator terminal 2 is a terminal used by the administrator and has a display unit 3 for displaying screens and an operation unit for providing the administrator with operation interfaces (e.g. a not-shown input device such as a keyboard). The administrator terminal 2, following the administrator's commands, requests the screen display device 6 to send display contents for interface screens and displays the interface screens on the display unit 3 based on the display contents sent by the screen display device 6. The administrator terminal 2, for example, displays on the display unit 3 an interface screen for defining deliverable SLOs and an interface screen for inputting target values defined for the deliverable SLOs or defining SLO groups.

The SLO management system according to the present invention communicates with a user terminal 4 (refer to FIG. 2) used by a user and the user terminal 4 displays interface screens. The user terminal 4 has a display unit 5 for displaying screens and an operation unit operated by the user (e.g. a not-shown input device such as a keyboard). The user terminal 4, following the user's commands, requests the screen display device 6 to send display contents for interface screens and displays the interface screens on the display unit 5 based on the display contents sent by the screen display device 6. The user terminal 4, for example, displays on the display unit 5 an interface screen for the user to select deliverable SLOs defined by the administrator and to input the user's requirement values for the deliverable SLOs.

The screen display device 6 holds display contents of interface screens to be displayed by the administrator terminal 2 and interface screens to be displayed by the user terminal 4. The display contents held by the screen display device 6 for various interface screens will be described in, for example, HTML (Hypertext Markup Language), etc. The description language, however, is not limited to HTML and other languages can be used.

Figure 3:
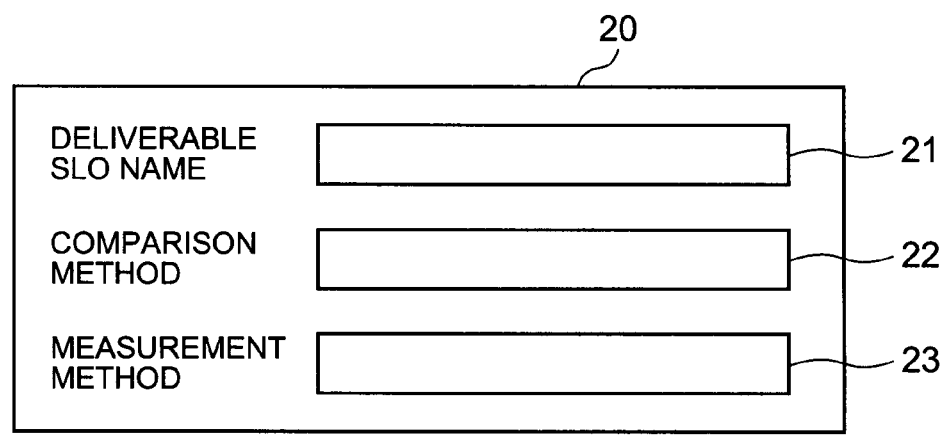
[FIG. 3] It depicts an explanatory diagram illustrating an example of a deliverable SLO setting screen.

An example of an interface screen displayed on the administrator terminal 2 based on display contents provided by the screen display device 6 will be described below. FIG. 3 is an explanatory diagram illustrating an example of an interface screen displayed on the administrator terminal 2. In FIG. 3, an interface screen for setting attributes of deliverable SLOs such as the name of an SLO (hereinafter, "deliverable SLO setting screen") is exemplified. The deliverable SLO setting screen 20 includes an entry field 21 for a deliverable SLO name, an entry field 22 for a comparison method, and an entry field 23 for a measurement method.

To the entry field 21 for a deliverable SLO name, the administrator inputs a deliverable SLO name (i.e. the name of a deliverable SLO).

To the entry field 22 for a comparison method, the administrator inputs a comparison method for comparing the value of the deliverable SLO defined by the administrator with the requirement value of the deliverable SLO specified by the user. To be more precise, a criterion by which the value of the deliverable SLO defined by the administrator is decided to satisfy the requirement value of the deliverable SLO specified by the user is input to the entry field 22. A typical format for a criterion input to the entry field 22 for a comparison method is the format using an inequality such as "input value<=" or "input value>=". The "input value" field at the left side of the above inequality means a requirement value specified by the user. The blank field at the right side is the value of a deliverable SLO defined by the administrator. The above definitions also apply to inequalities in FIG. 5 to be shown later. For example, an inequality "input value<=" means that if the criterion that "the user requirement value" is equal to or less than "the value of a deliverable SLO defined by the administrator" is met, the administrator-defined value satisfies the user-requirement value with respect to the deliverable SLO. Therefore, if "the user-requirement value" is larger than "the administrator-defined value of a deliverable SLO", it means that the administrator-defined value does not satisfy the user-requirement value.

An entry to the entry field 22 for a comparison method may include, instead of an inequality, a function that returns "true" or "false" using "the administrator-defined value of a deliverable SLO" and "the user-requirement value" as its variables. The "true" means that the administrator-defined value of a deliverable SLO satisfies the user-requirement value and the "false" means that the administrator-defined value of a deliverable SLO does not satisfy the user-requirement value. In the case of using such a function, the function needs to be defined in the SLO comparison device 8 in advance.

To the entry field 23 for a measurement method, a measurement method for measuring the value of the deliverable SLO during VM operation is input by the administrator. In general, there are few occasions that the value of an SLO is directly output from the VM providing a user with a service or directly recorded in the operation log. Thus, a computation method that states which VM output to be referred to, which part of an operation log to be referred to, and what kind of computation to be done to attain the value of a deliverable SLO during operation using these referred outputs is input to the entry field 23 for a measurement method. For example, let us suppose that an expression "notification completion time−trouble occurrence time" is input to the entry field 23 for a measurement method with regard to a deliverable SLO "notification time". The measurement method for the "notification time" means that the "notification time" can be measured by computing the difference between the "notification completion time" and the "trouble occurrence time" with referring to the "notification completion time" and the "trouble occurrence time" in various VM outputs and operation log. If the value of a deliverable SLO is directly output from a VM or directly recorded in the operation log, inputting a measurement method stating which output or which part of the operation log to be referred to suffices. Moreover, whereas an expression such as "notification completion time−trouble occurrence time" is used in the above description for the simplicity of explanation, a measurement method can be input by using pointers which indicate the locations of the "notification completion time" and the "trouble occurrence time". A measurement method of designating a search key as the information indicating the portion of the operation log to be referred to and using an instruction to refer to the portion of the operation log matching the search key can also be input.

After data are input to each entry field 21 to 23 and the input data are confirmed, the administrator terminal 2 transmits the screen display device 6 the input data to the entry fields 21 to 23. The screen display device 6 makes the SLO management device 7 store the input data to the entry fields 21 to 23. By repeating these processes, a deliverable SLO name, a comparison method, and a measurement method for every deliverable SLO are stored in the SLO management device 7 sequentially.

Figure 4:
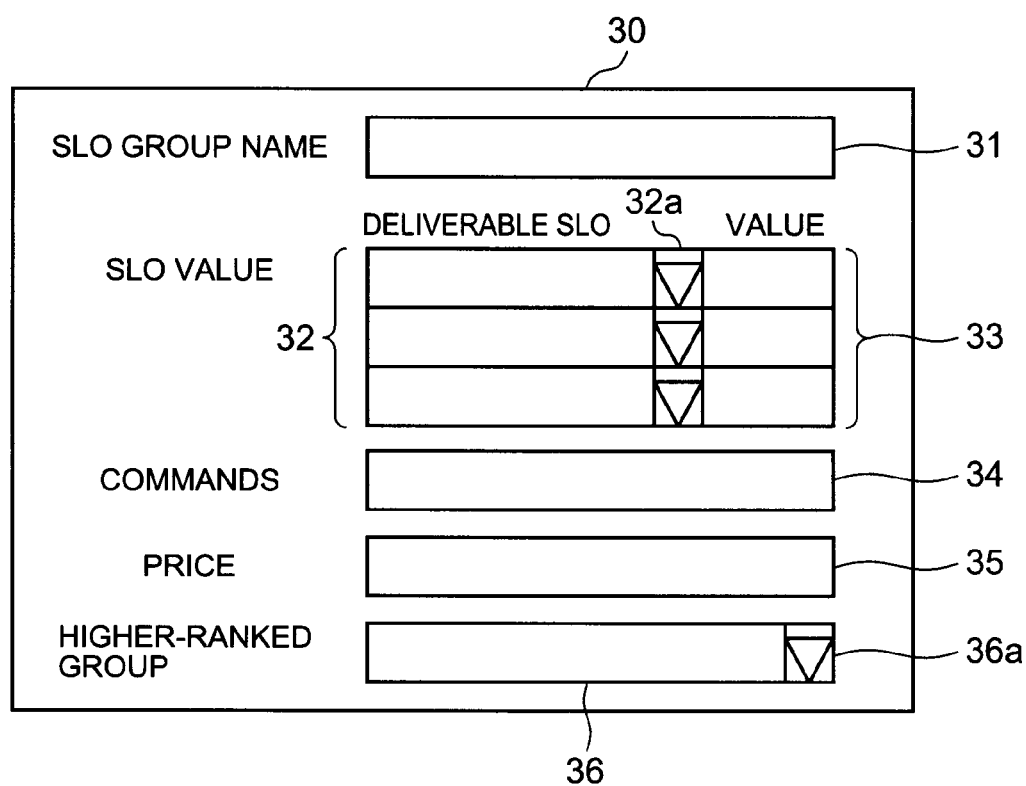
[FIG. 4] It depicts an explanatory diagram illustrating an example of an SLO group setting screen.

FIG. 4 is an explanatory diagram illustrating an example of another interface screen displayed on the administration terminal 2. FIG. 4 exemplifies an interface screen (hereinafter, "SLO group setting screen") on which the values of deliverable SLOs, an SLO group, and a hierarchical relationship between SLO groups are shown. The SLO group setting screen 30 has an entry field 31 for an SLO group name, entry fields 32 for deliverable SLOs included in the SLO group, entry fields 33 for the values of deliverable SLOs, an entry field 34 for commands which are applied to the servers in the partition to which the SLO group is defined when the SLO group is selected by the user, an entry field 35 for an operation cost (a price, in this example) of the servers to achieve the value of each deliverable SLO included in the SLO group, and an entry field 36 for a higher-ranked SLO group.

The name of an SLO group is input to the entry field 31 for an SLO group name by the administrator.

The names of deliverable SLOs included in the SLO group are input to the entry fields 32 for deliverable SLOs. Data input to each entry field 32, for example, may be done with a method where a pull-down menu button 32a is displayed as shown in FIG. 4, the deliverable SLO names which are input in the deliverable SLO setting screen 20 (refer to FIG. 3) and stored in the SLO management device 7 are displayed if the pull-down menu button 32a is used, and the administrator selects a deliverable SLO to be included in the SLO group from the displayed deliverable SLO names. Moreover, a plurality of deliverable SLOs to be included in the SLO group can be specified by displaying a plurality of entry fields 32. Only one deliverable SLO may be specified to be included in the SLO group.

To each entry field 33 for the value of a deliverable SLO, the value (target value) defined by the administrator for the deliverable SLO input to the corresponding entry field 32 is input.

The administrator terminal 2 accepts inputs of deliverable SLOs and SLO group definitions for every partition in the data center. Each SLO group defined in the SLO group setting screen 30 is therefore allocated to either one of the partitions. The administrator terminal 2 may define a relationship between an SLO group and a partition according to the administrator's operation. Similarly, the administrator terminal 2 may define a relationship between each deliverable SLO and a partition according to the administrator's operation. The entry field 34 for commands is an entry field for the administrator to input commands to be applied to the servers in the partition corresponding to the SLO group when a combination of SLO groups including the SLO group is selected by the user. A script is, for example, input to the entry field 34. For example, when the SLO group G4 shown in FIG. 1 is defined, a script is input to the entry field 34 in the SLO group setting screen 30 and executed if the combination "G1, G2, and G4" is selected on the user terminal 4. In this case, scripts input to the entry fields 34 in association with the SLO groups G1 and G2 are also executed at the same time. These scripts are executed by the provisioning device 10 (refer to FIG. 2). The user inputs to the entry field 34 commands for configuring a VM, with which the deliverable SLOs and their target values input to the entry fields 32 and 33 are achieved, on the servers in the partition corresponding to the SLO group in the case that an SLO group combination that includes the SLO group defined in the SLO group setting screen 30 is selected.

To the entry field 35 for a price, a server operation cost for achieving the values of deliverable SLOs included in the SLO group is input. An example where a server usage price per predetermined time is determined and input to the entry field 35 by the administrator will be described. The operational cost of the servers is, however, not limited to the price per predetermined time. For example, an entry field for power consumption per predetermined time at the servers for achieving the values of the deliverable SLOs included in the SLO group may be displayed instead of the price entry field 35. An entry field for $CO_2$ emission per predetermined time by using the servers for achieving the values of the deliverable SLOs included in the SLO group may also be displayed.

To the entry field 36 for a higher-ranked SLO group, the name of an SLO group ranked higher by one level than the SLO group whose name is input to the entry field 31 is input. Data entry to the entry field 36, for example, may be done with a method where a pull-down menu button 36a is displayed as shown in FIG. 4, the names of pre-defined SLO groups are displayed if the pull-down menu button 36a is used, and the administrator selects the name of an SLO group ranked higher by one level from the displayed names. The names of pre-defined SLO groups are stored in the SLO management device 7. In the case that the SLO group currently defined in the SLO group setting screen 30 is the highest-ranked SLO group, the input to the entry field 36 for a higher-ranked SLO group may be done by indicating "there is no higher-ranked group".

Furthermore, a plurality of higher-ranked SLO groups can be specified by inputting the names of the higher-ranked SLO groups to the entry field 36.

After data are input to each entry field 31 to 36 and the inputs are confirmed, the administrator terminal 2 transmits the screen display device 6 the input data to the entry fields 31 to 36 and the screen display device 6 makes the SLO management device 7 store the input data to the entry fields 31 to 36. By repeating these processes, SLO group names, deliverable SLOs and their values included in the SLO groups, commands (e.g. scripts) to be applied to the servers if the groups are selected by the user, operational costs (a price per predetermined time, in this example), and the names of SLO groups ranked higher by one level than the SLO groups are stored in the SLO management device 7 sequentially. As a result, information indicating higher-ranked or lower-ranked relationships (i.e. hierarchical relationships) among SLO groups is stored into the SLO management device 7 sequentially.

Figure 5:
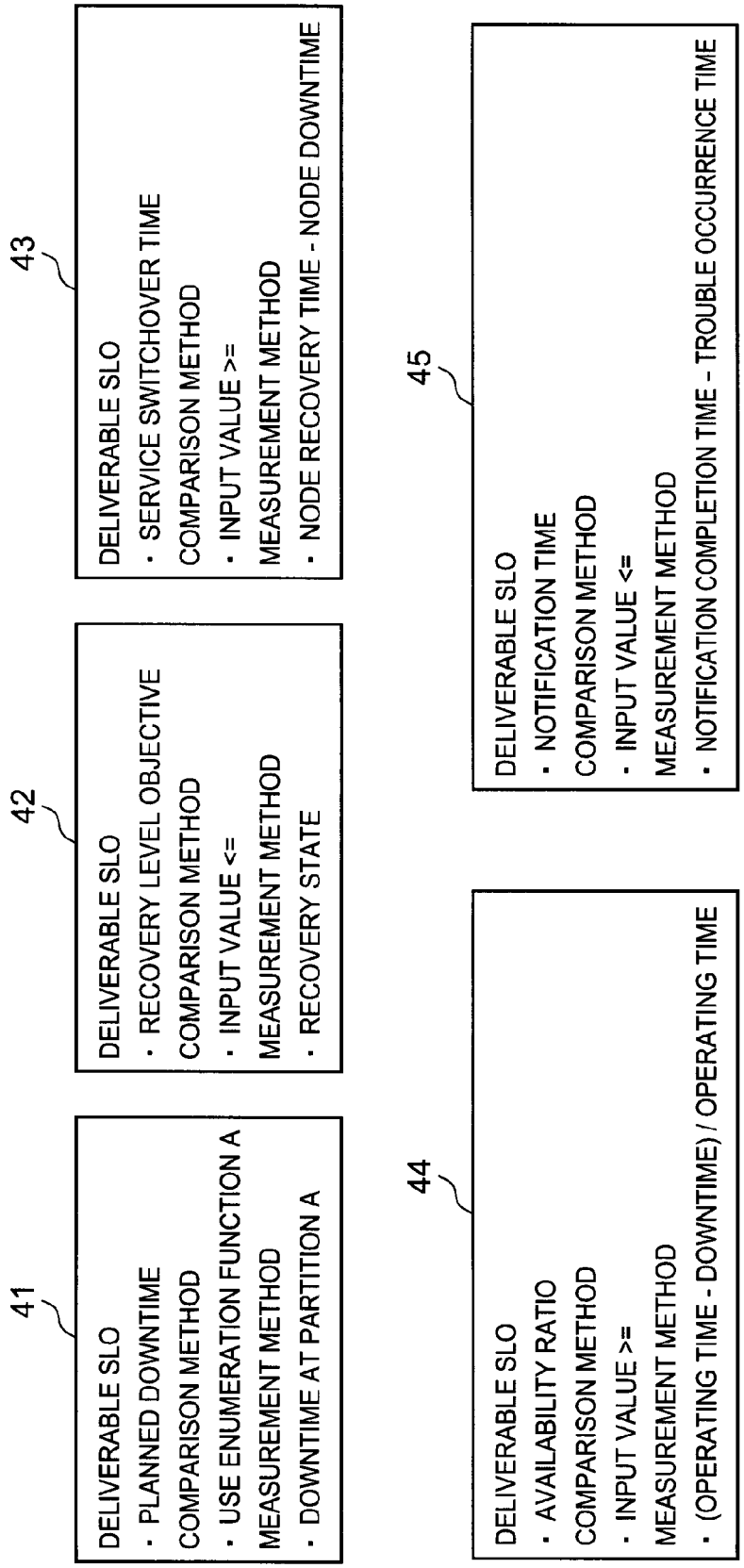
[FIG. 5] It depicts an explanatory diagram illustrating an example of deliverable SLOs defined via a deliverable SLO setting screen 20.

FIG. 5 illustrates an example of deliverable SLOs defined through the deliverable SLO setting screen 20. The deliverable SLO names of the deliverable SLOs 41 to 45 shown in FIG. 5 are "planned downtime", "recovery level objective", "service switchover time", "availability ratio", and "notification time" respectively. In this example, a case where an enumeration function A returning "true" or "false" is specified as the comparison method for the deliverable SLO 41 is shown. For each of deliverable SLOs 42 to 45, a case where the comparison method is specified using an inequality is shown. In FIG. 5, the measurement method defined for every deliverable SLO 41 to 45 is also shown.

Figure 6:
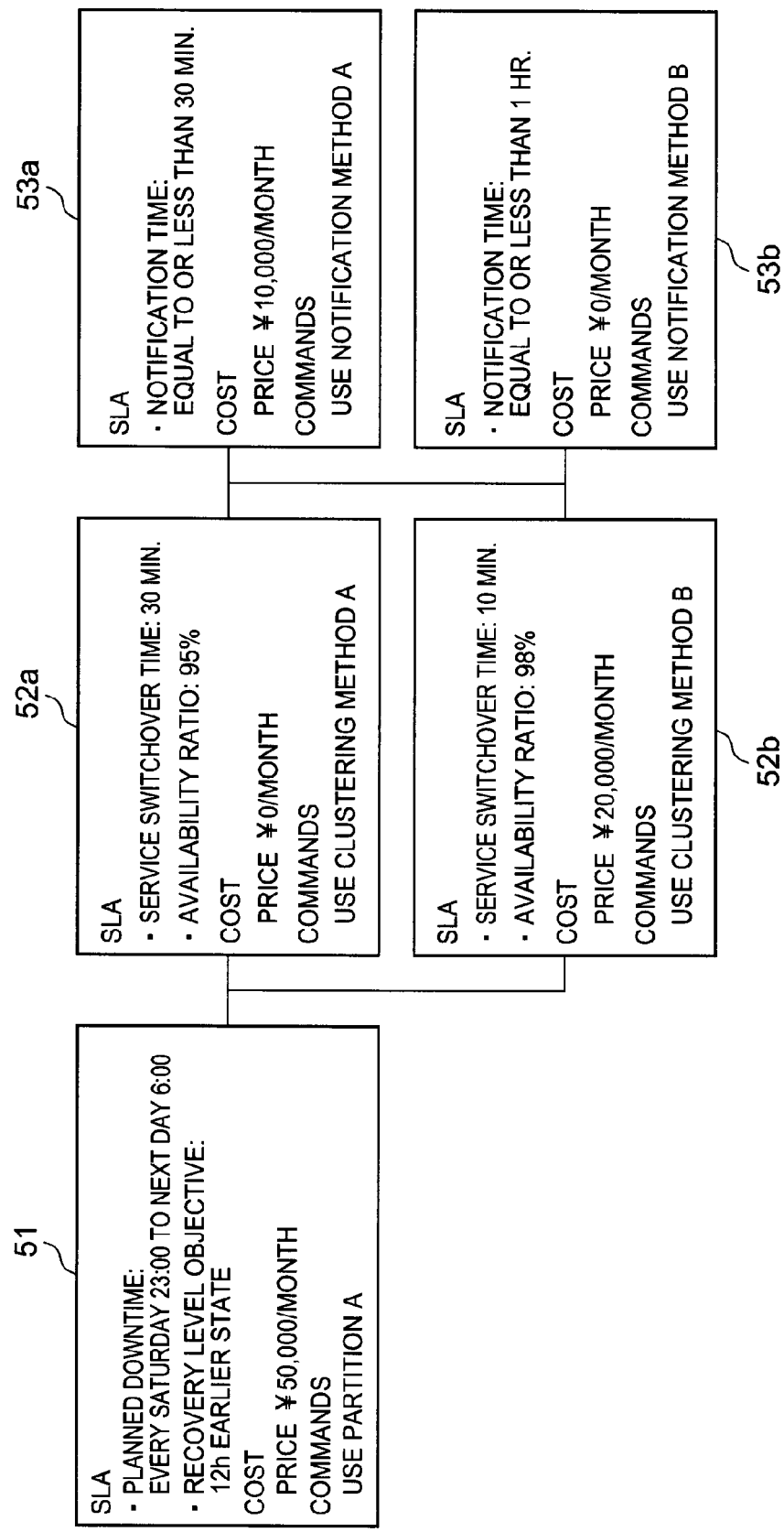
[FIG. 6] It depicts an explanatory diagram illustrating an example of SLO groups and a hierarchical structure thereof defined via a SLO group setting screen 30.

FIG. 6 illustrates an example of SLO groups defined through the SLO group setting screen 30 and their hierarchical relationships. The SLO group 51 in FIG. 6 is defined as an SLO group including the SLO "planned downtime" and the SLO "recovery level objective" shown in FIG. 5. The values of the "planned downtime" and the "recovery level objective" are also defined to the SLO group 51.

The SLO groups 52a and 52b shown in FIG. 6 are both defined as SLO groups having the SLO "service switchover time" and the SLO "availability ratio" shown in FIG. 5. However, to the value of the "service switchover time" and the value of the "availability ratio", different values are defined for each of SLO groups 52a and 52b respectively. Though a case where the same SLO group name is included in the SLO groups 52a and 53a is shown in this example, different deliverable SLO names can be defined in the SLO groups 52a and 53a.

The SLO groups 53a and 53b shown in FIG. 6 are both defined as SLO groups including the SLO "notification time" shown in FIG. 5. However, to the value of the "notification time", different values are defined for the SLO groups 53a and 53b. Though a case where the same SLO group name is included in the SLO groups 53a and 53b is shown in this example, different deliverable SLO names can be defined in the SLO groups 53a and 53b.

Furthermore, in each of the SLO groups 51, 52a, 52b, 53a, and 53b, commands to be applied to the servers when the user selects an SLO group combination including the SLO group and a server usage price per predetermined time (a price per month in this example) are also defined. In an SLO group having a deliverable SLO, the higher the quality of the target value defined to the deliverable SLO is, the higher is the price set to the deliverable SLO. For example, a higher price is set for the server usage price of the SLO group 52b that has "10 minutes" defined for the "service switchover time" and "98%" for the "availability ratio" than the SLO group 52a that has "30 minutes" defined for the "service switchover time" and "95%" for the "availability ratio". In the same way, a higher price is set for the server usage price of the SLO group 53a that has "less than or equal to 30 minutes" defined for the "notification time" than the SLO group 53b that has "less than or equal to 1 hour" defined for the "notification time".

The SLO management device 7 is a storage device that stores, for every partition, the properties of each deliverable SLO defined through the deliverable SLO setting screen 20, the properties of each SLO group defined through the SLO group setting screen 30, and the hierarchical level of each SLO group.

Figures 7, 8, 9:
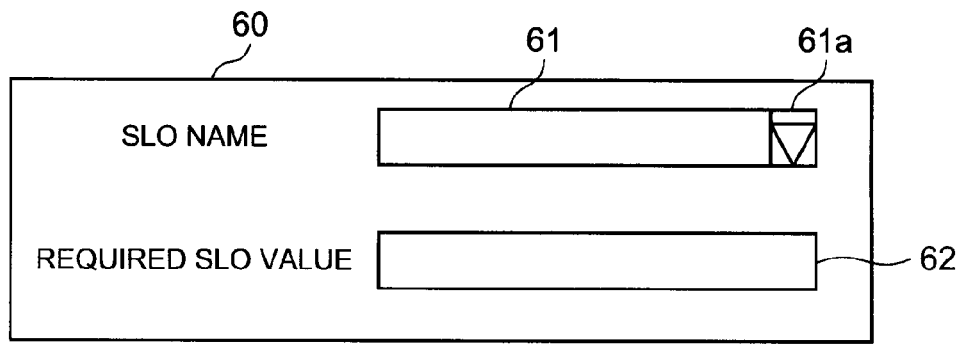
[FIG. 7] It depicts an explanatory diagram illustrating an example of a requirement value entry screen.
[FIG. 8] It depicts an explanatory diagram illustrating an example of a list screen of SLOs and requirement values thereof designated by a user.
[FIG. 9] It depicts an explanatory diagram illustrating an example of a screen of SLO group combinations specified by an SLO comparison device 8.

Next, an example of an interface screen displayed on the user terminal 4 based on display contents provided by the screen display device 6 will be described. FIG. 7 is an explanatory diagram illustrating an example of an interface screen displayed on the user terminal 4. An interface screen for a user to input a requirement value for an SLO (hereinafter, "requirement value input screen") is shown in FIG. 7. The requirement value input screen 60 includes an entry field 61 for a deliverable SLO name specified by the user and an entry field 62 for a requirement value for the SLO.

In the requirement value input screen 60, the user specifies an SLO by selecting a deliverable SLO out of the deliverable SLOs pre-defined by the administrator. Data input to the entry field 61, for example, may be done with a method where a pull-down menu button 61a is displayed as shown in FIG. 7, the names of SLO groups stored in the SLO management device 7 are displayed if the pull-down menu button 61a is clicked, and the user selects the name of a deliverable SLO from the displayed names.

To the entry field 62 for a requirement value, a requirement value for the SLO input to the entry field 61 (i.e. a deliverable SLO selected by the user) is input by the user.

After data are input to the entry fields 61 and 62 and the inputs are confirmed, the user terminal 2 transmits the screen display device 6 the input data to the entry fields 61 and 62. The screen display device 6 then transmits the SLO comparison device 8 the input data to the entry fields 61 and 62 (i.e. the confirmed data input to the entry fields 61 and 62).

The screen display device 6 also makes the user terminal 4 display a list screen of SLOs and their requirement values that have already been input. FIG. 8 illustrates an example of a list screen of SLOs and their requirement values specified by the user. When the screen display device 6 receives confirmed input data to the entry fields 61 and 62 from the user terminal 2, the screen display device 6 updates the list screen of SLOs and their requirement values by adding the received data.

Then, the user terminal 4 displays the updated list screen. The example in FIG. 8 illustrates that the value "every Saturday 5:00 to Sunday 23:00" is required for the SLO "planned downtime" by the user.

The SLO comparison device 8 compares the value of each deliverable SLO defined by the administrator with the requirement value of the SLO required by the user and specifies a plurality of SLO group combinations where in a higher degree the values of the deliverable SLOs defined by the administrator satisfy the user requirement values. In the comparison described above, the decision of whether or not the value of the deliverable SLO defined by the administrator satisfies the user requirement value is done according to the comparison method input in the deliverable SLO setting screen 20. The SLO group combination in the above description is a combination of SLO groups from the highest-ranked SLO group to the lowest-ranked SLO group within the SLO groups to which hierarchical relationships are defined by the administrator. Therefore, no two SLO groups belong to the same combination if neither higher-ranked nor lower-ranked relationship is defined between them. For example, in the example shown in FIG. 6, the SLO groups 52a and 52b, which have neither higher-ranked nor lower-ranked relationship between them, never belong to the same combination. Similarly, the SLO groups 53a and 53b cannot belong to the same combination.

When the SLO comparison device 8 specifies a plurality of SLO group combinations where in a high degree the user requirement values are satisfied, the SLO comparison device 8 makes the user terminal 4 display the plurality of SLO group combinations. FIG. 9 illustrates an example of a screen showing the SLO group combinations specified by the SLO comparison device 8. In the example shown in FIG. 9, an "achievement rate" indicates the degree to which the values of the deliverable SLOs included in the SLO group combination satisfy the user requirement values. The process in which the SLO comparison device 8 computes the achievement rate will be described later. A "price" indicates the sum of the prices defined for the SLO groups belonging to an SLO group combination.

The user, referring to the screen exemplified by FIG. 9, makes a decision regarding which SLO group combination to select and conducts an operation to select an SLO group combination. If a combination is selected from the SLO group combinations, the user terminal 4 transmits the SLO comparison device 8 the selected SLO group combination. The SLO comparison device 8 makes the user management device 9 store the SLO group combination selected by the user.

The user management device 9 is a storage device for storing the SLO group combination selected by the user.

The provisioning device 10 runs commands which are applied to the servers assigned to the SLO groups belonging to the SLO group combination selected by the user. For example, the provisioning device 10 executes commands written in a script language. The commands are designed to be applied to the servers in order to achieve the values of deliverable SLOs defined by the administrator for SLO groups and by executing the commands, the provisioning device 10 configures a VM on the servers in the partition corresponding to the SLO group combination selected by the user.

The operation management device 11 collects VM outputs and operation log records generated by the VM from the servers (i.e. the servers where the VM is configured) in the partition to which the operation management device 11 is allocated.

The SLO computing device 12 computes the values of deliverable SLOs during VM operation based on the VM outputs and operation log records collected by the operation management device 11 in the same partition according to the measurement method defined in the deliverable SLO setting process. In other words, the SLO computing device 12 computes the values of deliverable SLOs in the environment where the VM is providing the user with a service according to a pre-determined measurement method.

The SLO storage device 13 is a storage device for storing the values of deliverable SLOs during service provision computed by the SLO computing device 12. The SLO computing device 12, when the computation of the values of deliverable SLOs during service provision is finished, makes the SLO storage device 13 in the same partition store the values.

In the example shown in FIG. 2, a case where the screen display device 6, the SLO comparison device 8, the provisioning device 10, and the operation management device 11 and the SLO computing device 12 in each partition are separately configured is shown. The functions of these devices may be realized by the CPU of a computer driven by a program. For example, the CPU of a computer may read in a service level objective management program and, by running the program, execute the same functions as the screen display device 6, the SLO comparison device 8, the provisioning device 10, and the operation management device 11 and the SLO computing device 12 in each partition.

Next, the operation of the SLO management system will be described below.

Figure 10:
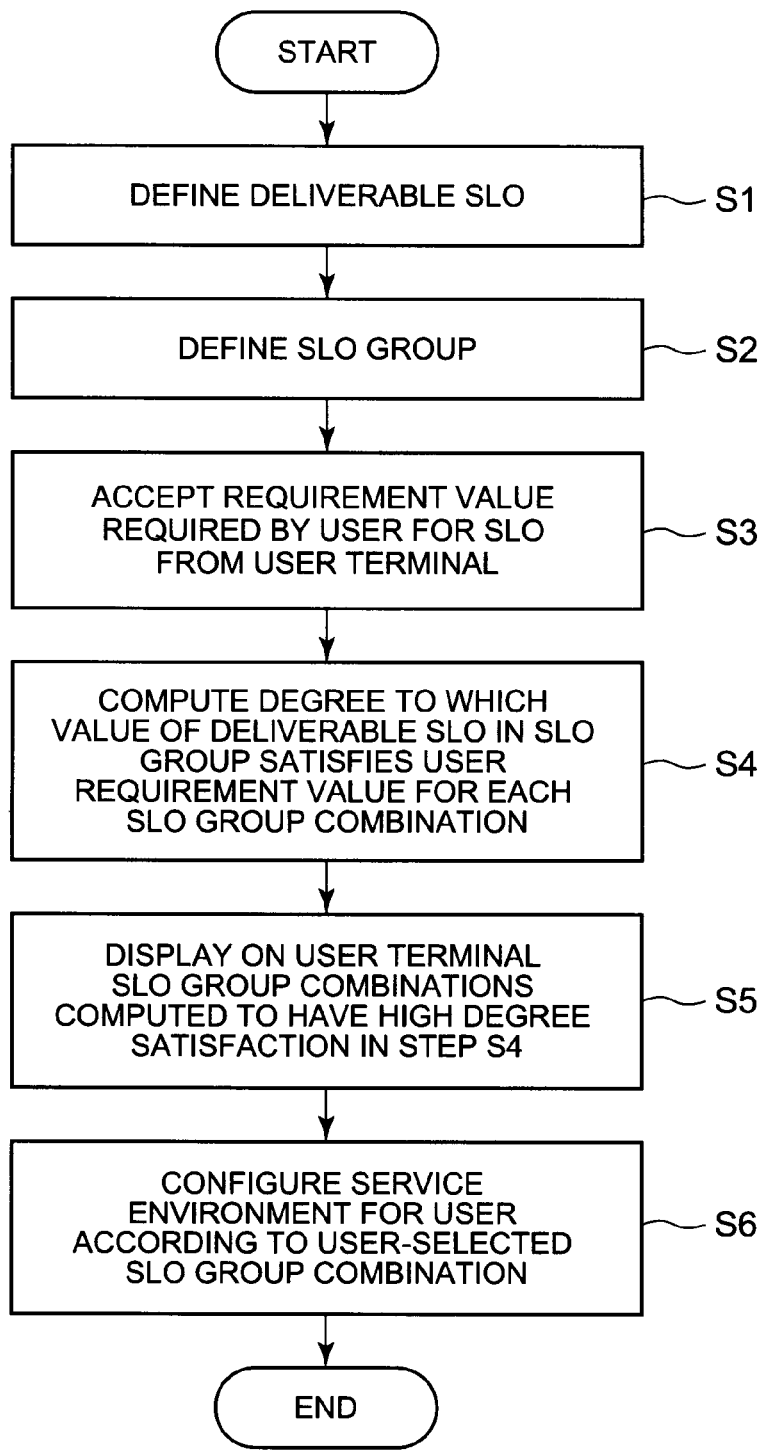
[FIG. 10] It depicts a flowchart illustrating an example of processes up to the SLO management system's configuration of an environment by which a service is provided to a user.

FIG. 10 is a flowchart illustrating an example of operational processes up to the configuration of an environment for service provision by which the SLO management system provides a service to a user.

First, the SLO management system defines deliverable SLOs according to the operation of the administrator (step S1). In step S1, the administrator terminal 2 requests the screen display device 6 to transmit display contents of the deliverable SLO setting screen 20 following a command by the administrator. The screen display device 6 provides the administrator terminal 2 with the display contents in response to the request. Then, the administrator terminal 2 displays the deliverable SLO setting screen 20, which is exemplified in FIG. 3, on the display unit 3 based on the display contents.

The administrator inputs a deliverable SLO name, a comparison method between a deliverable SLO value and a user requirement value, and a measurement method for the deliverable SLO value during service provision into the entry fields 21 to 23 in the deliverable SLO setting screen 20 respectively. After data are input to the entry fields 21 to 23 and the inputs are confirmed, the administrator terminal 2 transmits the screen display device 6 the input data to the entry fields 21 to 23, and the screen display device 6 makes the SLO management device 7 store the input data to the entry fields 21 to 23. In step S1, the administrator terminal 2 and the screen display device 6 repeat the process described above for every deliverable SLO until the deliverable SLO names, comparison methods and measurement methods with respect to all of the deliverable SLOs the administrator plans to define are input and stored into the SLO management device 7.

Next, the SLO management system defines SLO groups according to the operation of the administrator (step S2). In step S2, the administrator terminal 2 requests the screen display device 6 to transmit display contents of the SLO group setting screen 30 following a command by the administrator. The screen display device 6 provides the administrator terminal 2 with the display contents in response to the request. Then, the administrator terminal 2 displays the SLO group setting screen 30, which is exemplified in FIG. 4, on the display unit 3 based on the display contents.

The administrator inputs an SLO group name, deliverable SLOs and their values included in the SLO group, commands to be executed when an SLO group combination including the SLO group is selected by the user, a price (operational cost), and the name of an SLO group ranked higher by one level than the SLO group into the entry fields 31, 32, 33, 34, 35, and 36 in the SLO group setting screen 30 respectively. After data are input to the entry fields 31, 32, 33, 34, 35, and 36 and the inputs are confirmed, the administrator terminal 2 transmits the screen display device 6 the input data to the entry fields 31, 32, 33, 34, 35, and 36, and the screen display device 6 makes the SLO management device 7 store the input data. In step S2, the administrator terminal 2 and the screen display device 6 repeat the process described above for every SLO group until the SLO group names, deliverable SLOs and their values included in the SLO group, commands to be executed on the user's selection, prices, and the names of higher-ranked SLO groups with respect to all of the SLO groups the administrator plans to define are input and stored into the SLO management device 7.

Next, the SLO management system accepts requirement values required by the user for SLOs from the user terminal 4 (step S3). In step S3, the user terminal 4 requests the screen display device 6 to transmit display contents of the requirement value input screen 60 following a command by the administrator. The screen display device 6 provides the user terminal 4 with the display contents in response to the request. Then, the user terminal 4 displays the requirement value input screen 60, which is exemplified in FIG. 7, on the display unit 5 based on the display contents.

The user inputs the name of the SLO the user specifies and a requirement value required by the user for the SLO into the entry fields 61 and 62 in the requirement value input screen 60 respectively. For the input of an SLO, the user selects a deliverable SLO out of the deliverable SLOs defined by the administrator in step S1 and inputs the selected deliverable SLO. For example, the input to the entry field 61 by the user may be done by displaying all deliverable SLO names defined and stored in the SLO management device 7 in step S1 in a pull-down menu and making the user select a deliverable SLO name from the displayed names.

After data are input to the entry fields 61 and 62 and the inputs are confirmed, the user terminal 4 transmits the screen display device 6 the input data into the entry fields 61 and 62, and the screen display device 6 transmits the SLO comparison device 8 the input data (i.e. the SLO name and the user requirement value for the SLO). The screen display device 6 updates the list screen of current SLOs and their requirement values (e.g. a screen exemplified in FIG. 8) so as to also display newly added SLO names and their requirement values and makes the user terminal 4 display the updated screen. That is, every time the user inputs SLO names and their requirement values, the input SLO names and their requirement values are added to the list screen shown in FIG. 8.

In step S3, the user terminal 2 and the screen display device 6 repeat the input process for SLO names and requirement values until the start command for the specification of SLO group combinations which include the deliverable SLOs satisfying user requirement values in a high degree is received.

The screen display device 6 may include a button (not shown in the drawings) to direct the start of the specification of SLO group combinations which include the deliverable SLOs satisfying user requirement values in a high degree in the list screen which is exemplified, for example, in FIG. 8 or the requirement value input screen 60. If the button is clicked by the user, the user terminal 2 terminates the process of step S3 and transmits a request to start the specification process of an SLO group combination to the screen display device 9, and the screen display device 9 transmits the SLO comparison device 8 the start request. Then, the SLO comparison device 8 starts the process of step S4 described below.

In step S4, the SLO comparison device 8 computes, for each SLO group combination, the degree to which the values (the value defined by the administrator in step S2) of the deliverable SLOs included in the SLO groups satisfy the user requirement values. The SLO group combination in the above description is a combination of SLO groups from the highest-ranked SLO group to the lowest-ranked SLO group. In this example, the degree to which user requirement values are satisfied is defined as the ratio of the number of deliverable SLOs which are included in the SLO group combination and whose values satisfy the user requirement values specified by the user over the total number of SLOs to which user requirement values are specified. In the following description, the ratio (degree) will be denoted by "achievement rate".

Figure 11:
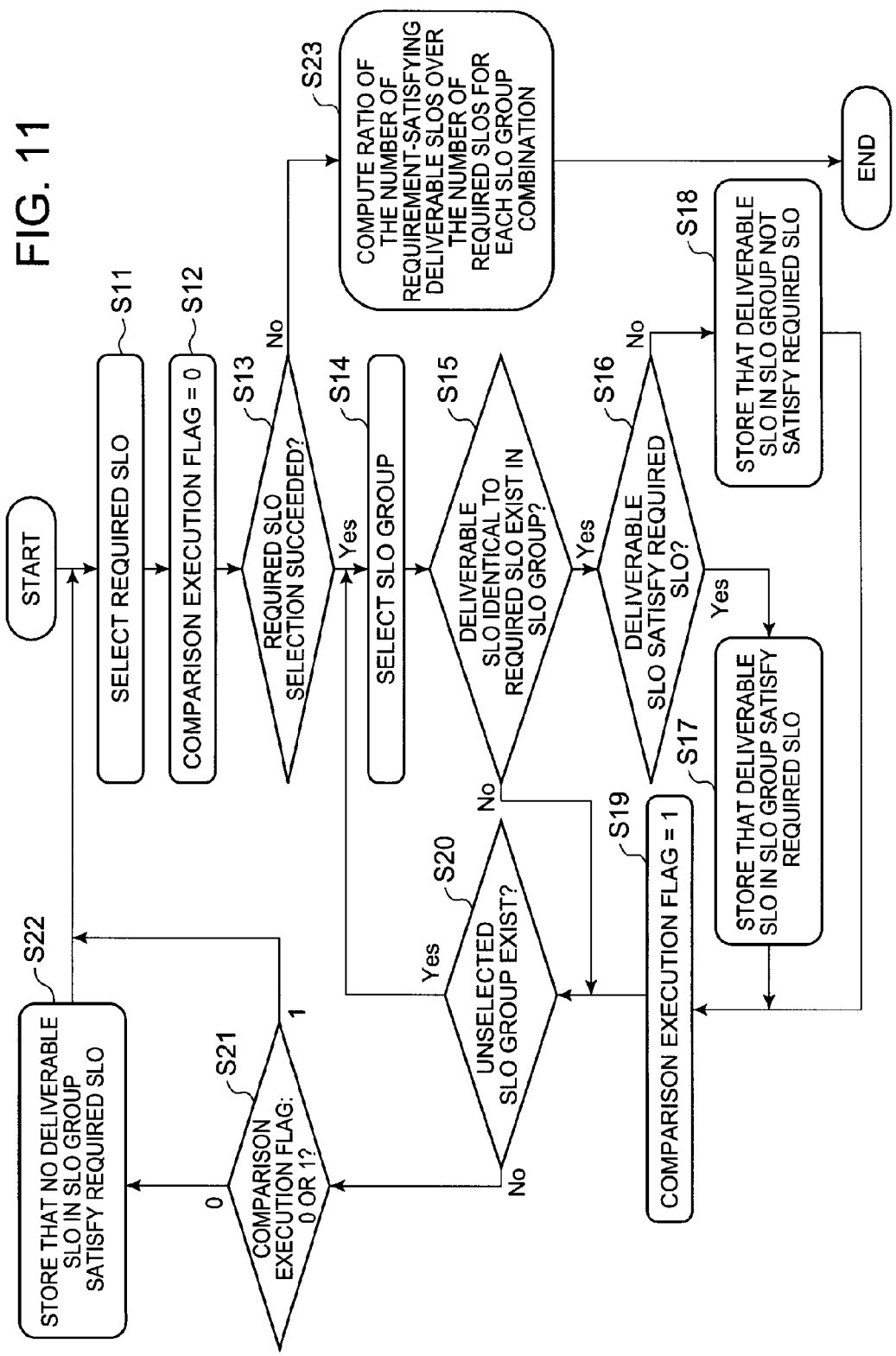
[FIG. 11] It depicts a flowchart illustrating an example of process details in step S4.

The detail process of step S4 will be described more fully hereinbelow. FIG. 11 is a flowchart illustrating an example of the detail process of step S4. In the following description, an SLO to which a requirement value is specified by the user in step S3 will be denoted by "required SLO".

The SLO comparison device 8 selects a required SLO and its requirement value out of the required SLOs to which requirement values are specified by the user in step S3 (i.e. the SLOs transmitted from the user terminal 4 via the screen display device 6) (step S11).

The SLO comparison device 8 then initializes a value of a comparison execution flag to "0" (step S12). The comparison execution flag is a flag indicating that a deliverable SLO corresponding to a required SLO selected in step S11 is included in at least one SLO group and a decision on the deliverable SLO and the required SLO is made to determine whether or not the deliverable SLO satisfies the required SLO. That the comparison execution flag is "0" means that the decision described above is not made with respect to the required SLO selected in step S11 and that the comparison execution flag is "1" means that the decision is made with respect to the required SLO selected in step S11. After the selection of a required SLO and its requirement value is done in step S11, the SLO comparison device 8 initializes the value of the comparison execution flag with respect to the required SLO to "0" in step S12.

The SLO comparison device 8 then determines whether or not the selection of a required SLO and its requirement value was successful in step S11 (step S13). That the selection of a required SLO and its requirement value in step S11 was not successful means that there remained no unselected required SLO in step S11. If the selection is determined to be not successful (i.e. the result of step S13 is "No"), the SLO comparison device 8 makes the process jump to step S23. If the selection of a required SLO and its requirement value in step S11 is determined to be successful (i.e. the result of step S13 is "Yes"), the SLO comparison device 8 makes the process proceed to step S14.

In step S14, the SLO comparison device 8 selects an unselected SLO group out of the SLO groups defined in step S2 (step S14). The SLO comparison device 8 then decides whether or not a deliverable SLO that is identical to the required SLO selected in step S11 is included in the SLO group selected in step S14 (step S15).

If no deliverable SLO that is identical to the required SLO is included in the selected SLO group (i.e. the result of step S15 is "No"), the process jumps to step S20.

If a deliverable SLO that is identical to the required SLO is included in the selected SLO group (i.e. the result of step S15 is "Yes"), the SLO comparison device 8 decides whether or not the value of the deliverable SLO satisfies the requirement value selected in step S11 (step S16). In step S16, the SLO comparison device 8 may decide whether or not the value of the deliverable SLO satisfies the value of the required SLO according to the comparison method defined in step S1.

If it is decided that the value of the deliverable SLO satisfies the value of the required SLO (i.e. the result of step S16 is "Yes"), the SLO comparison device 8 stores that the value of the deliverable SLO which is identical to a required SLO in the selected SLO group satisfies the requirement value of the required SLO (step S17).

If it is decided that the value of the deliverable SLO does not satisfy the value of the required SLO (i.e. the result of step S16 is "No"), the SLO comparison device 8 stores that the value of the deliverable SLO which is identical to a required SLO in the selected SLO group does not satisfy the requirement value of the required SLO (step S18).

After step S17 or S18, the SLO comparison device 8 set the value of the comparison execution flag to "1" (step S19). That the value of the comparison execution flag is "1" means the process of step S16 has been done at least once with respect to the selected required SLO.

After step S19, the process proceeds to step S20. In step S20, the SLO comparison device 8 decides whether or not, within the SLO groups selected in step S2, an unselected SLO group (i.e. an SLO group that has not been selected yet in step S14) exists (step S20). If an unselected SLO group exists (i.e. the result of step S20 is "Yes"), the SLO comparison device 8 repeats the processes from step S14.

A concrete example with respect to the loop processes in steps S14 to S20 will be described below. It is supposed that the deliverable SLOB 41 to 45 shown in FIG. 5 and the SLO groups 51, 52a, 52b, 53a, and 53b shown in FIG. 6 are defined in the example. It is also supposed that the SLO comparison device 8 selects the "service switchover time" as a required SLO in step S11 and the requirement value of the required SLO is "15 minutes". The SLO comparison device 8 is further supposed to select the SLO group 52a (refer to FIG. 6) in step S14. The value of the "service switchover time" is defined to be "30 minutes" in the SLO group 52a (refer to FIG. 6). The comparison method for the SLO "service switchover time" is defined as "input value>=" (refer to FIG. 5). Because the inequality "15 minutes>=30 minutes" is ineffective (i.e. the result of step S16 is "No"), the SLO comparison device 8 stores that the "service switchover time" in the SLO group 52a does not satisfy the requirement value of the required SLO (step S18).

The SLO comparison device 8 is supposed to decide that unselected SLO groups exist in the following step S20, return to step S14, and select the SLO group 52b (refer to FIG. 6). The value of the "service switchover time" is defined to be "10 minutes" in the SLO group 52b (refer to FIG. 6). As described above, the comparison method for the SLO "service switchover time" is defined as "input value>=". Because the inequality "15 minutes>=10 minutes" is effective (i.e. the result of step S16 is "Yes"), the SLO comparison device 8 stores that the "service switchover time" in the SLO group 52b satisfies the requirement value of the required SLO (step S17).

If either one of the SLO groups 51, 53a, and 53b, which are shown in FIG. 6, is selected in step S15, the process jumps to step S20 without going through steps S16 to S19 because the SLO "service switchover time" is not included in the SLO groups.

If no unselected SLO group exists in step S20 (i.e. the result of S20 is "No"), the SLO comparison device 8 decides which value is set to the comparison execution flag, "1" or "0" (step S21). If the value of the comparison execution flag is "0", it means that the selected required SLO was not included in any SLO group defined in step S2. In the case that the value of the comparison execution flag is "0", the SLO comparison device 8 stores that no deliverable SLO included in the SLO group defined in step S2 satisfies the requirement value of the selected required SLO (step S22). After the process in step S22, the flow returns to step S11 and repeats the processes from step S11. In the case that the value of the comparison execution flag is "1" in step S21, the flow returns to step S11 without carrying out step S22.

If the SLO comparison device 8 decides that the selection of a required SLO and its requirement value was a failure in step S11 (i.e. the result of step S13 is "No"), the SLO comparison device 8 computes the ratio of the number of deliverable SLOB which are decided to satisfy the requirement value of the required SLO over the number of required SLOB for every SLO group combination (step S23). The ratio computed in step S23 is the achievement rate. Whether or not every deliverable SLO belonging to an SLO group combination satisfies the requirement value of a required SLO can be decided by referring to the records stored in steps S17, S18, and S22 in the loop processes after step S11.

For example, for the case where the SLO groups 51, 52a, 52b, 53a, and 53b are defined as shown in FIG. 6, four combinations, namely "the SLO groups 51, 52a, and 53a", "the SLO groups 51, 52a, and 53b", "the SLO groups 51, 52b, and 53a", and "the SLO groups 51, 52b, and 53b", can be made as a combination of SLO groups from the highest-ranked SLO group to the lowest-ranked SLO group. It is supposed that the "planned downtime", the "recovery level objective", the "service switchover time", the "availability ratio", and the "notification time" are defined by the user as required SLOs.

It is also supposed that each of the requirement values of the "planned downtime" and the "recovery level objective" is satisfied by the SLO group 51, each of the requirement values of the "service switchover time" and the "availability ratio" is satisfied by the SLO group 52a, and the requirement value of the "notification time" is not satisfied by the SLO group 53a. Under the above suppositions, the number of the deliverable SLOs satisfying the corresponding requirement value is "4" while the number of required SLOs is "5" in the combination of "the SLO groups 51, 52a, and 53a". Therefore, the result of computation by the SLO comparison device 8 for the achievement rate of the SLO group combination is 4/5=80%.

In another case, it is supposed that each of the requirement values of the "planned downtime" and the "recovery level objective" is satisfied by the SLO group 51, each of the requirement values of the "service switchover time" and the "availability ratio" is satisfied by the SLO group 52a, and the requirement value of the "notification time" is satisfied by the SLO group 53b. Under the above supposition, the number of the deliverable SLOs satisfying the corresponding requirement value is "5" while the number of required SLOs is "5" in the combination of "the SLO groups 51, 52a, and 53b". Therefore, the result of computation by the SLO comparison device 8 for the achievement rate of the second SLO group combination is 5/5=100%.

The SLO comparison device 8 computes the achievement rate for every combination of SLO groups by the process described above. If a required SLO that is not specified to any identical deliverable SLO in any SLO group defined by the administrator exists in the required SLOs, the achievement rate will decrease. For example, if the SLO groups shown in FIG. 6 are defined and, in addition to "planned downtime", "recovery level objective", "service switchover time", "availability ratio", and "notification time", further required SLOs are defined, a lower achievement rate will be produced than the achievement rate in the example described above.

At the completion of the process in step S23, the process in step S4 (refer to FIG. 10) ends. The flow is in the state where the achievement rate for every SLO group combination is calculated.

After step S4, the SLO comparison device 8 specifies a plurality of combinations that have high achievement rates out of the SLO group combinations. This process is not limited to any specific embodiment. For example, SLO group combinations in predetermined number can be specified in descending order starting from the SLO group having the highest achievement rate. Specifying SLO group combinations that have achievement rates higher than or equal to a predetermined threshold may be an alternative way. The SLO comparison device 8 computes, for each specified combination, the sum of costs (price in the example) defined for the SLO groups included in the combination. The SLO comparison device 8 transmits, for each specified combination, the display contents of a screen displaying the SLO groups included in the combination, the achievement rate, and the computed sum of costs (e.g. a screen shown in FIG. 9) to the user terminal 4 and makes the user terminal 4 display the screen (step S5).

The user terminal 4 displays, for a plurality of combinations specified in step S5, the SLO groups included in the combinations, the achievement rates, and the computed sums of costs (prices) based on the display contents transmitted by the SLO comparison device 8 as shown in FIG. 9. The deliverable SLOs included in the SLO group combinations displayed on the screen are a collection of deliverable SLOs that satisfy user requirement values completely or deliverable SLOs whose values are close to user requirement values. Furthermore, the values of these deliverable SLOs are the values of deliverable SLOs that are achieved by systems (VMs) providing services to the user.

Though, in FIG. 9, the SLO groups, the achievement rates, and the computed sum of costs (prices) with respect to the selected combinations are shown, the SLO comparison device 8 may make the user terminal 4 also show the deliverable SLOs that do not satisfy the requirement values of corresponding required SLOs out of all deliverable SLOs included in the combinations.

The user conducts an operation to determine which combination of SLO groups to be selected from displayed SLO group combinations with reference to the achievement rates and the sums of costs. In other words, the user terminal 4 accepts an operation to select a combination of SLO groups out of displayed combinations of SLO groups. When the user terminal 4 accepts this operation, the user terminal 4 transmits the SLO comparison device 8 information indicating the selected SLO group combination. Upon receiving the information, the SLO comparison device 8 makes the user management device 9 store the information (information indicating the SLO group combination selected by the user).

The provisioning device 10, with reference to the information indicating the SLO group combination selected by the user, reads in the setting information of the SLO groups included in the SLO group combination from the SLO management device 7. That is, the provisioning device 10 reads in the information defined by the administrator in step S2 with respect to each SLO group included in the combination selected by the user. Then, the provisioning device 10 extracts commands to be applied to the servers defined for the SLO groups and executes the commands on the servers in the partition corresponding to the SLO groups. With these commands, the provisioning device 10 configures a VM to achieve the values of deliverable SLOs defined in the SLO group on the servers in the partition allocated to the SLO group which belongs to the selected SLO group combination (step S6).

Figures 12, 13:
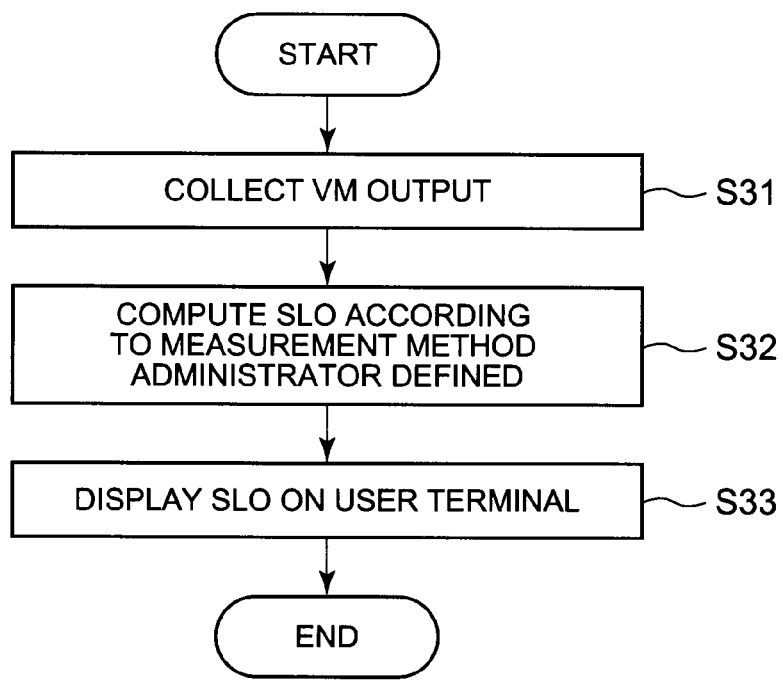
[FIG. 12] It depicts a flowchart illustrating an example of a process where the value of an SLO is computed in accordance with VM operation status.
[FIG. 13] It depicts an explanatory diagram illustrating an example of relations between a description by an administrator and an actual output depending on a platform.

Next, a process to compute the values of SLOs based on the operation status of a VM after the above-described configuration of the VM on the servers in the data center is done will be described below. FIG. 12 is a flow chart illustrating an example of this process. A VM configured on the servers provides a user with a service such as IaaS, PaaS, etc. The VM outputs information on the status of operation to provide services to the user. The style of this output may be either outputting an operation log or outputting, instead of a log, some values indicating operation status directly to the operation management device 11.

The operation management device 11 in the partition where the VM in operation resides collects information output from the VM (e.g. an operation log, some values output directly to the operation management device 11, etc.) (step S31).

The SLO computing device 12 reads in the measurement methods of the deliverable SLOs belonging to the SLO group combination selected by the user. Because the SLO group combination selected by the user is stored in the user information management device 9, the SLO computing device 12 may specify the SLO groups belonging to the combination selected by the user with reference to the information. The SLO computing device 12 may read in the measurement method of each deliverable SLO belonging to each SLO group from the SLO management device 7.

Next, the SLO computing device 12, according to the measurement method of each deliverable SLO belonging to the SLO group combination selected by the user, computes the value of each SLO using VM output information collected by the operation management device 12 in step S31 (step S32). The value of the SLO can be said to be the value of SLO achieved by the VM in operation.

In the measurement method defined for a deliverable SLO (e.g. the measurement method input to the entry field 23 in the example screen shown in FIG. 3), computing methods for the SLO value such as which information output from the VM to be used and how the computation to be done are indicated. For example, in a measurement method, information reference indexes such as what type of information to be referred to, which VM on which server outputs the information, which description record in the operation log to be referred to, etc. are designated. The SLO computing device 12 may compute the values of SLOs by referring to information indexed by such information reference indexes within the information collected by the operation management device 11 and executing computation designated in the measurement method using the information.

If the name of a VM output defined in a measurement method by the administrator differs from the name of output actually output from the VM, storing a table showing the relationships between defined VM outputs and actual outputs into, for example, the SLO management device 7 may be a countermeasure against the difference. For example, it is supposed that the administrator inputs "$\Sigma_{node}.CPU$" as the definition of a measurement method. The description means computing the sum of CPU utilizations at every VM. In the above definition, the administrator uses "CPU" for designating the CPU utilization in the measurement method definition. The name of CPU utilization, however, differs depending on the type of platform. Therefore, in this case, storing a table exemplified, for example, by FIG. 13 into the SLO management device 7 will solve the difference. The table in FIG. 13 shows that a value corresponding to "% Processor Time" is used as CPU utilization if the administrator's description is "CPU" and the platform of the VM outputting information is Windows (registered trademark). It is also shown that if the platform of the VM is Linux (registered trademark), a value corresponding to "% system+% user" is used as CPU utilization. At the computation of "$\Sigma_{node}.CPU$" the SLO computing device 12 may compute the sum of CPU utilizations using either "% Processor Time" or "% system+% user" depending on the platform at the source of output.

Whereas a case where the sum of CPU utilizations is computed as a value of an SLO is described above, the SLO computing device 12 computes the value of every SLO according to the measurement method for the SLO.

Next, the SLO computing device 12 makes the SLO storage device 13 store the computed value of each SLO.

Furthermore, the SLO computing device 12 repeats the computation of each SLO value as time progresses and makes the SLO storage device 13 store the SLO values with the timing data of computation.

Then, the screen display device 6, in response to a request from the user terminal 4, creates display contents of a screen displaying SLO values stored in the SLO storage device 13 and transmits the display contents to the user terminal 4. The user terminal, based on the display contents, makes the display unit 5 display the screen displaying SLO values.

Figure 14:
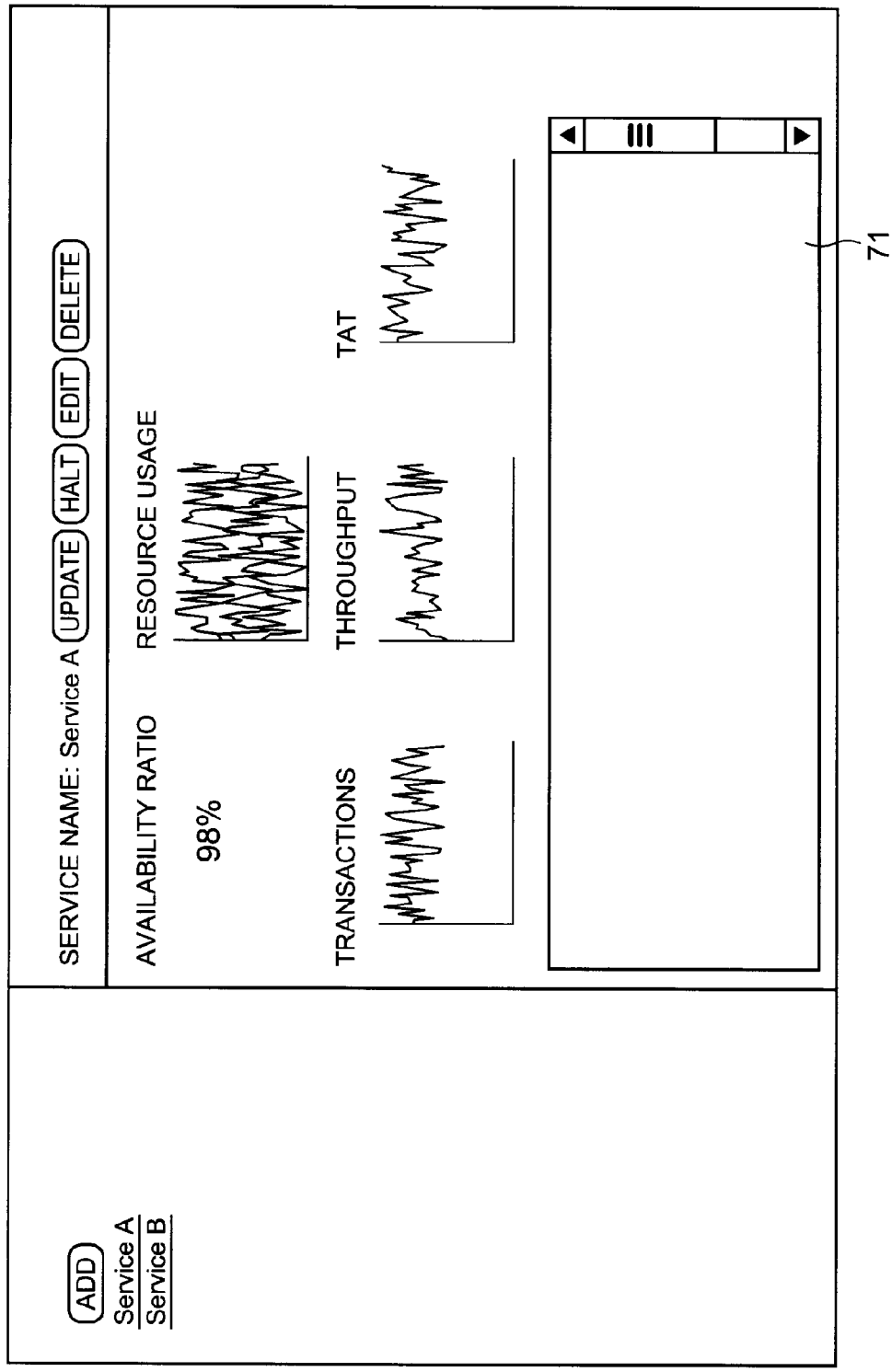
[FIG. 14] It depicts an explanatory diagram illustrating an example of a screen indicating SLOs during service provision.

FIG. 14 illustrates an example of an SLO display screen to be displayed during service provision. In FIG. 14, an example screen displaying availability ratio, resource usage, transaction amount, throughput, and TAT (Turn Around Time) is shown. As shown in FIG. 14, the movement of an SLO value over time may be presented in a graph. Moreover, the screen display device 6 may have a log view area 71 in the screen for SLO values during service provision as shown in FIG. 14. The screen display device 6 may display operation log records produced by a VM in the log view area 71.

According to the exemplary embodiment of the present invention, the service level objective management system is able to accept inputs, from the administrator, of the definitions of deliverable SLOs and SLO groups through interface screens exemplified in FIG. 3 and FIG. 4. In addition, the service level objective management system is able to accept inputs, from the user, of SLOs and their requirements values specified by the user through the interface screen exemplified in FIG. 7. The SLO comparison device 8 computes the degree of satisfaction (achievement rate) of user requirements for every SLO group combination by executing the processes of steps S11 to S23 (refer to FIG. 11), specifies SLO group combinations having high achievement rates, and prompts the user to select a combination of SLO groups. Thus, SLOs and their values of the system (VM) configured for provisioning a user with a service can be determined.

Furthermore, SLOs of a configured VM during service provision can be determined through the processes in steps S31 and S32 executed by the operation management device 11 and the SLO computing device 12.

Moreover, the SLO management system of the exemplary embodiment displays interface screens exemplified, for example, by FIG. 3, FIG. 4, etc. Therefore, the SLO management system of the exemplary embodiment can be said as the interface screen display system.

Figure 15:
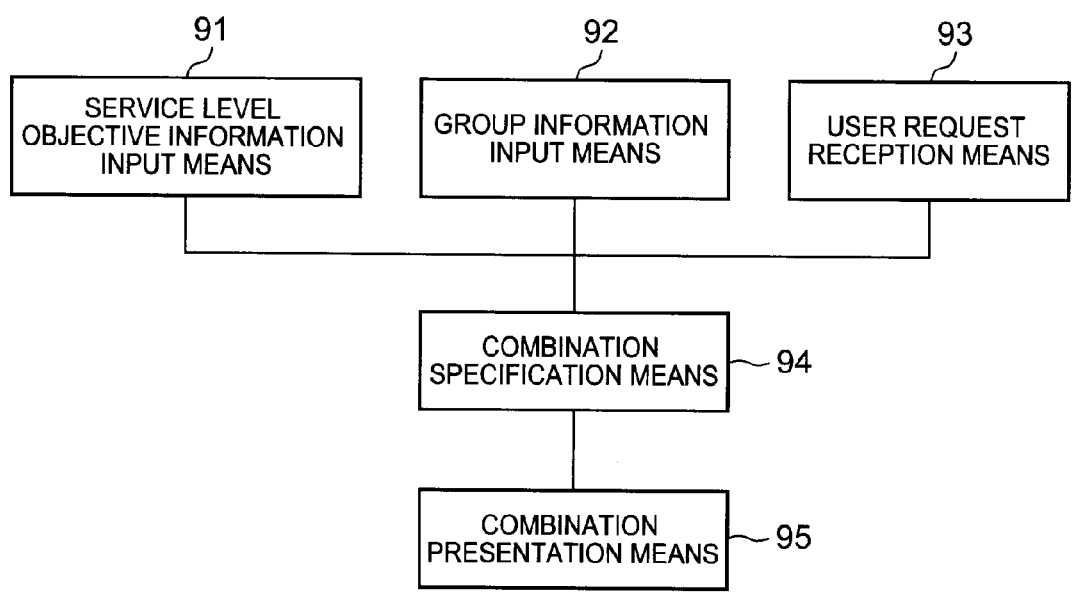
[FIG. 15] It depicts a block diagram illustrating an example of a minimum configuration of the SLO management system of the present invention.

Next, a minimum configuration of the present invention will be described. FIG. 15 is a block diagram illustrating an example of a minimum configuration of the present invention.

The SLO management system (service level objective management system) according to the present invention has a service level objective information input means 91, a group information input means 92, a user requirement reception means 93, a combination specification means 94, and a combination presentation means 95.

To the service level objective information input means 91 (e.g. a screen display device 6 and an administrator terminal 2 executing step S1), service level objective names, which are the names of service level objectives defined by an administrator, and conditions on which the values defined by the administrator for the service level objectives satisfy the requirement values required by a user provided with the service by the data center for the service level objectives are input by the administrator.

To the group information input means 92 (e.g. the screen display device 6 and the administrator terminal 2 executing step S2), group names which are the names of the service level objective groups that include at least one service level objective out of the service level objectives whose names are input to the service level objective information input means 91, service level objective names of the service level objectives included in the service level objective groups, target values defined by the administrator for the service level objectives, and group names of other service level objective groups to which the administrator defines hierarchical relationships with the service level objective group are input by the administrator.

The user requirement reception means 93 (e.g. the screen display device 6 executing step S2) receives service level objective names of the service level objectives specified by the user and requirement values required by the user for the service level objectives out of the service level objectives whose names are input to the service level objective information input means 91 from the user terminal provided with a service by the data center.

The combination specification means 94 (e.g. the SLO comparison device 8 executing step S4), for each combination of service level objective groups from the highest-ranked service level objective group to the lowest-ranked service level objective group within the hierarchized service level objective groups, computes the degree to which the target value of each service level objective in the service level objective group belonging to the combination satisfies the requirement value received from the user terminal with the service level objective name and specifies a plurality of combinations with higher degrees of satisfaction according to a predetermined criterion (e.g. a criterion of selecting the predetermined number of combinations from the combination with the highest degree in descending order or a criterion of choosing the combinations with the degrees higher than a threshold).

The combination presentation means 95 (e.g. the SLO comparison device 8 executing step S5) transmits the user terminal display contents of the screen on which each service level objective group combination specified by the combination specification means 94 is displayed and receives information of the service level objective group combination selected by the user from the user terminal.

The object of the present invention will be achieved with the configuration described above.

Part or the entirety of the above exemplary embodiment can be described as in the following Supplementary notes and, however, is by no means limited to the following Supplementary notes.

(Supplementary note 1) A service level objective management system, including: a service level objective information input means that inputs, from an administrator of a data center, a service level objective name which is the name of a service level objective defined by the administrator and a condition on which a value defined by the administrator for the service level objective satisfies a requirement value for the service level objective required by a user whom a service is provided from the data center; a group information input means that inputs a group name which is the name of a service level objective group including at least one service level objective out of service level objectives whose service level objective names are input to the service level objective information input means by the administrator, a service level objective name of each service level objective included in the service level objective group, a target value defined by the administrator for each of the service level objectives, and a group name of another service level objective group to which the administrator defines a hierarchical relationship with the service level objective group; a user requirement reception means that receives, from a user terminal of a user who is provided a service from the data center, a service level objective name of a service level objective specified by the user out of service level objectives whose service level objective names are input to the service level objective information input means and a requirement value required by the user for the service level objective; a combination specification means that computes, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifies a plurality of combinations having high degrees by a predetermined criterion; and a combination presentation means that transmits display contents of a screen displaying the individual combination of service level objective groups specified by the combination specification means to the user terminal and receives information on the combination of service level objective groups selected by the user from the user terminal.

(Supplementary note 2) The service level objective management system of Supplementary note 1, wherein the service level objective information input means displays a service level objective setting screen which is an interface screen including an entry field for a service level objective name and an entry field for a condition on which a value defined by the administrator for the service level objective satisfies the requirement value of the user.

(Supplementary note 3) The service level objective management system of Supplementary note 1 or 2, wherein the group information input means displays a group setting screen which is an interface screen including an entry field for a group name of a service level objective group, an entry field for a service level objective name of each service level objective included in the service level objective group, an entry field for a target value of each of the service level objectives, and an entry field for a group name of another service level objective group to which the administrator defines an hierarchical relationship with the service level objective group.

(Supplementary note 4) The service level objective management system of either one of Supplementary notes 1 to 3, wherein the group information input means displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for a cost incurred in providing the user with a service using servers in the data center so as to achieve each of the target values, and the combination presentation means transmits the user terminal display contents of a screen displaying a combination of service level objective groups specified by the combination specification means, a degree computed for the combination, and the sum of costs input to entry fields for a cost for every service level objective group belonging to the combination.

(Supplementary note 5) The service level objective management system of either one of Supplementary notes 1 to 4, wherein the user requirement reception means, by transmitting the user terminal display contents of the requirement value input screen which is an interface screen including an entry field for a service level objective name of a service level objective specified by a user and an entry field for a requirement value required by the user for the service level objective, makes the user terminal display the requirement value input screen.

(Supplementary note 6) The service level objective management system of either one of Supplementary notes 1 to 5, further including: a service provision environment configuration means that configures a service provision environment, on servers in the data center, which achieves a target value of each service level objective defined in a service level objective group belonging to a combination of service level objective groups selected by a user.

(Supplementary note 7) The service level objective management system of Supplementary note 6, wherein the group information input means displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for commands applied to servers in the data center when a combination including the service level objective group is selected by the user and the service provision environment configuration means configures a service provision environment by applying to servers in the data center the commands input to the entry field for commands with respect to each service level objective group belonging to a combination selected by the user.

(Supplementary note 8) The service level objective management system of either one of Supplementary notes 1 to 7, further including: an output collection means that collects output from servers on which a service execution environment is configured; and a service level objective computation means that computes a value of a service level objective during the operation of service provision to a user based on the output from the servers according to a predetermined measurement method.

(Supplementary note 9) The service level objective management system of Supplementary note 8, wherein the service level objective information input means displays a service level objective setting screen including an entry field for a service level objective name, an entry field for a condition on which a value defined for a service level objective by the administrator satisfies a requirement value of a user, and an entry field for a measurement method of the service level objective during the operation of service provision to the user and the service level objective computation means computes a value of a service level objective during the operation of service provision according to a measurement method input to the entry field for a measurement method.

(Supplementary note 10) A service level objective management method, including: receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center; receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group; receiving, from a user terminal of a user who is provided a service from the data center, a service level objective name of a service level objective specified by the user out of service level objectives whose service level objective names are input and a requirement value required by the user for the service level objective; computing, for every combination of service level objective groups from a highest-ranked service level objective group to a lowest-ranked service level objective group among hierarchized service level objective groups, a degree at which the target value of each service level objective in the service level objective group belonging to the combination satisfies the requirement value received from the user terminal with the service level objective name; specifying a plurality of combinations having the high degrees by a predetermined criterion; transmitting display contents of a screen displaying the specified combination of service level objective groups individually to the user terminal; and receiving information of the combination of service level objective groups selected by the user from the user terminal.

(Supplementary note 11) A service level objective management program for making a computer execute: service level objective information input processing for receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center; group information input processing for receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group; user requirement reception processing for receiving, from a user terminal of a user who is provided a service from the data center, a service level objective name of a service level objective specified by the user out of service level objectives whose service level objective names are input and a requirement value required by the user for the service level objective; combination specification processing for computing, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifying a plurality of combinations having the high degrees by a predetermined criterion; and combination presentation processing for transmitting display contents of a screen displaying the specified combination of service level objective groups individually to the user terminal and receiving information of the combination of service level objective groups selected by the user from the user terminal.

(Supplementary note 12) A interface screen display system, including: a service level objective setting screen display means that displays a service level objective setting screen which is an interface screen including an entry field for a service level objective name which is the name of a service level objective defined by an administrator of a data center and an entry field for a condition on which a value defined for the service level objective by the administrator satisfies a requirement value of the service level objective required by a user who is provided with a service by the data center; and a group setting screen display means that displays a group setting screen which is an interface screen including an entry field for a group name which is the name of a service level objective group including at least one service level objective out of service level objectives whose service level objective names are input to the service level objective setting screen, an entry field for a service level objective name of each service level objective included in the service level objective group, an entry field for a target value defined by the administrator for each of the service level objectives, and an entry field for a group name of another service level objective group to which the administrator defines a hierarchical relationship with the service level objective group.

(Supplementary note 13) A service level objective management system, including: a service level objective information input unit that inputs, from an administrator of a data center, a service level objective name which is the name of a service level objective defined by the administrator and a condition on which a value defined by the administrator for the service level objective satisfies a requirement value for the service level objective required by a user whom a service is provided from the data center; a group information input unit that inputs a group name which is the name of a service level objective group including at least one service level objective out of service level objectives whose service level objective names are input to the service level objective information input unit by the administrator, a service level objective name of each service level objective included in the service level objective group, a target value defined by the administrator for each of the service level objectives, and a group name of another service level objective group to which the administrator defines a hierarchical relationship with the service level objective group; a user requirement reception unit that receives, from a user terminal of a user who is provided a service from the data center, a service level objective name of a service level objective specified by the user out of service level objectives whose service level objective names are input to the service level objective information input unit and a requirement value required by the user for the service level objective; a combination specification unit that computes, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifies a plurality of combinations having the high degree by a predetermined criterion; and a combination presentation unit that transmits display contents of a screen displaying the individual combination of service level objective group specified by the combination specification unit to the user terminal and receives information of the combination of service level objective groups selected by the user from the user terminal.

(Supplementary note 14) The service level objective management system of Supplementary note 13, wherein the service level objective information input unit displays a service level objective setting screen which is an interface screen including an entry field for a service level objective name and an entry field for a condition on which a value defined by the administrator for the service level objective satisfies the requirement value of the user.

(Supplementary note 15) The service level objective management system of Supplementary note 13 or 14, wherein the group information input unit displays a group setting screen which is an interface screen including an entry field for a group name of a service level objective group, an entry field for a service level objective name of each service level objective included in the service level objective group, an entry field for a target value of each of the service level objectives, and an entry field for a group name of another service level objective group to which the administrator defines an hierarchical relationship with the service level objective group.

(Supplementary note 16) The service level objective management system of either one of Supplementary notes 13 to 15, wherein the group information input unit displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for a cost incurred in providing the user with a service using servers in the data center so as to achieve each of the target values, and the combination presentation unit transmits the user terminal display contents of a screen displaying a combination of service level objective groups specified by the combination specification unit, a degree computed for the combination, and the sum of costs input to entry fields for a cost for every service level objective group belonging to the combination.

(Supplementary note 17) The service level objective management system of either one of Supplementary notes 13 to 16, wherein the user requirement reception unit, by transmitting the user terminal display contents of the requirement value input screen which is an interface screen including an entry field for a service level objective name of a service level objective specified by a user and an entry field for a requirement value required by the user for the service level objective, makes the user terminal display the requirement value input screen.

(Supplementary note 18) The service level objective management system of either one of Supplementary notes 13 to 17, further including: a service provision environment configuration unit that configures a service provision environment, on servers in the data center, which achieves a target value of each service level objective defined in a service level objective group belonging to a combination of service level objective groups selected by a user.

(Supplementary note 19) The service level objective management system of Supplementary note 18, wherein the group information input unit displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for commands applied to servers in the data center when a combination including the service level objective group is selected by the user and the service provision environment configuration unit configures a service provision environment by applying to servers in the data center the commands input to the entry field for commands with respect to each service level objective group belonging to a combination selected by the user.

(Supplementary note 20) The service level objective management system of either one of Supplementary notes 13 to 19, further including: an output collection unit that collects output from servers on which a service execution environment is configured; and a service level objective computation unit that computes a value of a service level objective during the operation of service provision to a user based on the output from the servers according to a predetermined measurement method.

(Supplementary note 21) The service level objective management system of Supplementary note 20, wherein the service level objective information input unit displays a service level objective setting screen including an entry field for a service level objective name, an entry field for a condition on which a value defined for a service level objective by the administrator satisfies a requirement value of a user, and an entry field for a measurement method of the service level objective during the operation of service provision to the user and the service level objective computation unit computes a value of a service level objective during the operation of service provision according to a measurement method input to the entry field for a measurement method.

This application claims priority based on Japanese Patent Application No. 2011-096395, filed on Apr. 22, 2011, the entire disclosure of which is incorporated herein by reference The present invention was described above through an exemplary embodiment thereof, but the present invention is not limited to the above exemplary embodiment. Various modifications that could be understood by a person skilled in the art may be applied to the configurations and details of the present invention within the scope of the present invention.

INDUSTRIAL APPLICABILITY

The present invention is suitably applied to the management of SLOs in a data center.

REFERENCE SIGNS LIST

1 Data center
2 Administrator terminal
4 User terminal
6 Screen display device
7 SLO management device
8 SLO comparison device
9 User management device
10 Provisioning device
11 Operation management device
12 SLO computing device
13 SLO storage device

The invention claimed is:

1. A service level objective management system, comprising:
a service level objective information input unit implemented at least by a hardware including a processor and that inputs, from an administrator of a data center, a service level objective name which is the name of a service level objective defined by the administrator and a condition on which a value defined by the administrator for the service level objective satisfies a requirement value for the service level objective required by a user whom a service is provided from the data center;
a group information input unit implemented at least by a hardware including a processor and that inputs a group name which is the name of a service level objective group including at least one service level objective out of service level objectives whose service level objective names are input to the service level objective information input unit by the administrator, a service level objective name of each service level objective included in the service level objective group, a target value defined by the administrator for each of the service level objectives, and a group name of another service level objective group to which the administrator defines a hierarchical relationship with the service level objective group;
a user requirement reception unit implemented at least by a hardware including a processor and that receives, from a user terminal of a user who is provided a service from the data center, a service level objective name of a service level objective specified by the user out of service level objectives whose service level objective names are input to the service level objective information input unit and a requirement value required by the user for the service level objective;
a combination specification unit implemented at least by a hardware including a processor and that computes, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifies a plurality of combinations having high degrees by a predetermined criterion; and
a combination presentation unit implemented at least by a hardware including a processor and that transmits display contents of a screen displaying the individual combination of service level objective groups specified by the combination specification means unit to the user terminal and receives information on the combination of service level objective groups selected by the user from the user terminal.

2. The service level objective management system of claim 1, wherein
the service level objective information input unit displays a service level objective setting screen which is an interface screen including an entry field for a service level objective name and an entry field for a condition on which a value defined by the administrator for the service level objective satisfies the requirement value of the user.

3. The service level objective management system of claim 1, wherein
the group information input unit displays a group setting screen which is an interface screen comprising an entry field for a group name of a service level objective group, an entry field for a service level objective name of each service level objective included in the service level objective group, an entry field for a target value of each of the service level objectives, and an entry field for a group name of another service level objective group to which the administrator defines an hierarchical relationship with the service level objective group.

4. The service level objective management system of wherein
the group information input unit displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for a cost incurred in providing the user with a service using servers in the data center so as to achieve each of the target values, and
the combination presentation unit transmits the user terminal display contents of a screen displaying a combination of service level objective groups specified by the combination specification unit, a degree computed for the combination, and the sum of costs input to entry fields for a cost for every service level objective group belonging to the combination.

5. The service level objective management system of claim 1, wherein
the user requirement reception unit, by transmitting the user terminal display contents of the requirement value input screen which is an interface screen including an entry field for a service level objective name of a service level objective specified by a user and an entry field for a requirement value required by the user for the service level objective, makes the user terminal display the requirement value input screen.

6. The service level objective management system of claim 1 further comprising:
a service provision environment configuration unit implemented at least by a hardware including a processor and that configures a service provision environment, on servers in the data center, which achieves a target value of each service level objective defined in a service level objective group belonging to a combination of service level objective groups selected by a user.

7. The service level objective management system of claim 6, wherein
the group information input unit displays a group setting screen including an entry field for a group name of a service level objective group, an entry field for a service level objective name of each service level objective included in the service level objective group, an entry field for a target value of each of the service level objectives, an entry field for a group name of another service level objective group to which the administrator defines a hierarchical relationship with the service level objective group, and an entry field for commands applied to servers in the data center when a combination including the service level objective group is selected by the user and the service provision environment configuration unit configures a service provision environment by applying to servers in the data center the commands input to the entry field for commands with respect to each service level objective group belonging to a combination selected by the user.

8. The service level objective management system of claim 1 further comprising:
an output collection unit implemented at least by a hardware including a processor and that collects output from servers on which a service execution environment is configured; and
a service level objective computation unit implemented at least by a hardware including a processor and that computes a value of a service level objective during the operation of service provision to a user based on the output from the servers according to a predetermined measurement method.

9. The service level objective management system of claim 8, wherein
the service level objective information input unit displays a service level objective setting screen including an entry field for a service level objective name, an entry field for a condition on which a value defined for a service level objective by the administrator satisfies a requirement value of a user, an entry field for a measurement method of the service level objective during the operation of service provision to the user and
the service level objective computation unit computes a value of a service level objective during the operation of service provision according to a measurement method input to the entry field for a measurement method.

10. A service level objective management method, implemented by a processor, comprising:
receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center;
receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group;
receiving, from a user terminal of a user who is provided a service from the data center, a service level objective name of a service level objective specified by the user out of service level objectives whose service level objective names are input and a requirement value required by the user for the service level objective;
computing, for every combination of service level objective groups from a highest-ranked service level objective group to a lowest-ranked service level objective group among hierarchized service level objective groups, a degree at which the target value of each service level objective in the service level objective group belonging to the combination satisfies the requirement value received from the user terminal with the service level objective name;

specifying a plurality of combinations having the high degrees by a predetermined criterion;

transmitting display contents of a screen displaying the specified combination of service level objective groups individually to the user terminal; and receiving information of the combination of service level objective groups selected by the user from the user terminal.

11. A non-transitory computer-readable recording medium in which a service level objective management program is recorded, the service level objective management program causing a computer to execute:

service level objective information input processing for receiving input, from an administrator of a data center, of a service level objective name which is the name of a service level objective defined by the administrator and a condition on which a value defined by the administrator for the service level objective satisfies a requirement value for the service level objective required by a user whom a service is provided from the data center;

group information input processing for receiving input, from the administrator, of a group name which is the name of a service level objective group including at least one service level objective out of service level objectives whose service level objective names are input, a service level objective name of each service level objective included in the service level objective group, a target value defined by the administrator for each of the service level objectives, and a group name of another service level objective group to which the administrator defines a hierarchical relationship with the service level objective group;

user requirement reception processing for receiving, from a user terminal of a user who is provided a service from the data center, a service level objective name of a service level objective specified by the user out of service level objectives whose service level objective names are input and a requirement value required by the user for the service level objective;

combination specification processing for computing, for every combination of service level objective groups from a highest-ranked service level objective group to a lowest-ranked service level objective group among hierarchized service level objective groups, a degree to which the target value of each service level objective in the service level objective group belonging to the combination satisfies the requirement value received from the user terminal with the service level objective name and specifying a plurality of combinations having the high degrees by a predetermined criterion; and combination presentation processing for transmitting display contents of a screen displaying the individual combination of service level objective groups specified by the combination specification processing to the user terminal and receiving information of the combination of service level objective groups selected by the user from the user terminal.

\* \* \* \* \*

UNITED STATES PATENT AND TRADEMARK OFFICE
CERTIFICATE OF CORRECTION

PATENT NO. : 8,818,831 B2
APPLICATION NO. : 13/977760
DATED : August 26, 2014
INVENTOR(S) : Shinjiro Yagi It is certified that error appears in the above-identified patent and that said Letters Patent is hereby corrected as shown below:

IN THE SPECIFICATION:

Column 16, Line 33: Delete "SLOB" and insert -- SLOs --

Column 17, Line 17: Delete "SLOB" and insert -- SLOs --

Column 17, Line 18: Delete "SLOB" and insert -- SLOs --

IN THE CLAIMS:

Column 29, Line 13: In Claim 4, delete "of" and insert -- of claim 1, --

Signed and Sealed this
Twenty-fourth Day of February, 2015

Michelle K. Lee
*Deputy Director of the United States Patent and Trademark Office*